(12) United States Patent
Lovell

(10) Patent No.: US 11,565,850 B1
(45) Date of Patent: Jan. 31, 2023

(54) PORTABLE SECURITY CASE AND MOUNTING BRACKET

(71) Applicant: Michael Patrick Lovell, Lynchburg, VA (US)

(72) Inventor: Michael Patrick Lovell, Lynchburg, VA (US)

(*) Notice: Subject to any disclaimer, the term of this patent is extended or adjusted under 35 U.S.C. 154(b) by 188 days.

(21) Appl. No.: 17/163,412

(22) Filed: Jan. 30, 2021

Related U.S. Application Data

(60) Provisional application No. 62/968,908, filed on Jan. 31, 2020.

(51) Int. Cl.
*B65D 25/20* (2006.01)
*B65D 55/02* (2006.01)
*F16M 13/02* (2006.01)
*B65D 43/16* (2006.01)

(52) U.S. Cl.
CPC .......... *B65D 25/20* (2013.01); *B65D 43/163* (2013.01); *B65D 55/02* (2013.01); *F16M 13/02* (2013.01)

(58) Field of Classification Search
CPC ...... B65D 25/20; B65D 43/163; B65D 55/02; F16M 13/02
USPC .................................................. 220/481
See application file for complete search history.

(56) References Cited

U.S. PATENT DOCUMENTS

| | | |
|---|---|---|
| 4,788,838 A | 12/1988 | Cislo |
| 4,890,466 A | 1/1990 | Cislo |
| 5,009,088 A | 4/1991 | Cislo |
| 5,170,907 A * | 12/1992 | Sakai ...................... E05G 1/005 220/325 |
| 5,172,575 A | 12/1992 | Fisher |
| 5,226,540 A | 7/1993 | Bradbury |
| 5,701,770 A | 12/1997 | Cook et al. |
| 5,881,874 A | 3/1999 | McKinney |
| 6,041,924 A | 3/2000 | Tajima |
| 6,260,300 B1 | 7/2001 | Klebes et al. |
| 6,279,359 B1 | 8/2001 | Boisvert |
| D462,519 S | 9/2002 | Gaydos et al. |
| 6,488,148 B1 | 12/2002 | Woodson |
| 7,451,872 B1 | 11/2008 | Allen |

(Continued)

FOREIGN PATENT DOCUMENTS

| | | | |
|---|---|---|---|
| CN | 207315107 U | 5/2018 | |
| GB | 2468690 A * | 9/2010 | ............. A45C 13/18 |
| GB | 2473844 A * | 3/2011 | ............. E05G 1/005 |

*Primary Examiner* — J. Gregory Pickett
*Assistant Examiner* — Niki M Eloshway
(74) *Attorney, Agent, or Firm* — Shaddock Law Group, PC

(57) ABSTRACT

A security case and mounting bracket, including at least some of a base, a cavity defined within at least a portion of the base, a lid pivotable between an open position and a closed position, in the closed position the lid covers the cavity, a receiver extends from two opposing exterior sides of the base, and an elongate receiver groove extends along each receiver; the mounting bracket has a bottom portion and two extending arms, a rail element extends from an interior surface of each extending arm and is mateable with the elongate receiver grooves so as to be slidably received within one of the elongate receiver grooves; various locking mechanisms are controlled by a controller electrically connected to a data input interface, the controller is able to simultaneously or independently control the locking mechanisms to allow the security case to be unlocked and/or removed from the mounting bracket.

20 Claims, 16 Drawing Sheets

(56) References Cited

U.S. PATENT DOCUMENTS

| | | |
|---|---|---|
| 7,478,724 B2 | 1/2009 | Vor Keller |
| 8,074,477 B1 | 12/2011 | Weiche |
| D657,354 S | 4/2012 | Kim |
| 8,186,188 B1 | 5/2012 | Brown |
| 8,201,426 B2 | 6/2012 | Heim et al. |
| 8,297,464 B2 | 10/2012 | Grenier et al. |
| 8,327,777 B2 | 12/2012 | Heim et al. |
| 8,506,023 B2 | 8/2013 | Goldie |
| 8,534,206 B2 | 9/2013 | Heim et al. |
| 8,770,116 B2 | 7/2014 | Heim et al. |
| 8,826,704 B1 | 9/2014 | Marshall |
| 8,910,498 B2 * | 12/2014 | Saucier .................. A47G 29/10 70/164 |
| 8,931,422 B2 | 1/2015 | Heim et al. |
| 9,010,257 B2 | 4/2015 | McAlexander |
| 9,021,840 B2 | 5/2015 | Andrews |
| 9,459,074 B2 | 10/2016 | Heim et al. |
| 9,624,711 B2 | 4/2017 | McAlexander |
| 2008/0237939 A1 | 10/2008 | McDonnough et al. |
| 2013/0055933 A1 | 3/2013 | Markman et al. |
| 2013/0133558 A1 * | 5/2013 | Andrews ................... E05G 1/00 109/50 |
| 2014/0014541 A1 | 1/2014 | Junk |
| 2014/0245934 A1 | 9/2014 | Delattre et al. |
| 2015/0000571 A1 | 1/2015 | Stemen |
| 2015/0096910 A1 | 4/2015 | Carson et al. |
| 2015/0114861 A1 | 4/2015 | Heim et al. |
| 2015/0168099 A1 | 6/2015 | Hyde et al. |
| 2016/0084614 A1 | 3/2016 | Ellingson |
| 2020/0307879 A1 * | 10/2020 | Karlsson ................ B65D 55/02 |
| 2021/0092864 A1 * | 3/2021 | Cha ........................ H05K 7/183 |
| 2022/0114853 A1 * | 4/2022 | Emde ....................... G07C 9/23 |
| 2022/0257041 A1 * | 8/2022 | Redford ................. A47G 29/20 |

* cited by examiner

PORTABLE SECURITY CASE AND MOUNTING BRACKET

CROSS-REFERENCE TO RELATED APPLICATIONS

This patent application claims the benefit of U.S. Patent Application Ser. No. 62/968,908 filed Jan. 31, 2020, the disclosure of which is incorporated herein by reference in its entirety.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE INVENTION

1. Field of the Invention

The present disclosure relates generally to the field of locking security cases. More specifically, the present disclosure relates to portable security cases.

2. Description of Related Art

Portable secure storage security cases for valuables such as guns, jewelry, currency and the like, have long been known and widely used. Secure security cases or lock boxes that have mechanical locking mechanisms, key locks, combination locks, digital keypads and/or biometric readers have been known and widely used. Secure security cases or lock boxes of various types go back at least to the turn of this century and generally, these security cases have several common features. The security cases have a box like construction, with four sides and bottom; a cover or lid that connects to the box like portion by a hinge in the back of the security case, and they have a locking mechanism that prevents the cover or lid from being opened without the proper authorization, (biometric reader, digital keypad, physical key, mechanical combination, etc.).

Though such security cases have achieved considerable popularity and commercial success, there is a continuing need to improve these security cases, locking mechanisms, and to provide better security, more portability and allow the user more freedom and ease of access.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE INVENTION

However, what is lacking in prior art and is greatly needed is a system, method, and device that allows a user to have easy and quick access to the security case contents and the ability to securely fasten the security case to fixed location, thus giving users freedom and security.

There are over three-hundred million firearms in America. Over one-third of Americans own a gun. Many, if not most, gun owners keep loaded firearms in their homes, vehicles and at work. From 2006-2016, almost 6,885 people in the U.S. died from unintentional shootings. In 2016 alone, there were 495 incidents of accidental firearm deaths. Accidental gun deaths occur mainly in those under 25 years old. In 2014, 2,549 children (age 0-19) died by gunshot and an additional 13,576 were injured. The market needs an improved securing system, method, and device that provides reliable quick access to authorized users, while allowing easy portability and unsurpassed security.

To overcome these and other shortcomings, the security case of the present disclosure provides an easily portable security case that delivers reliable, easy, quick access to authorized users and also provides the ability to securely fasten and unfasten the security case to a fixed location. The current gun security case market forces the user to choose between security cases that provide good security but are not portable and security cases designed for the masses without any thought towards securing the security case itself. Some security cases are not designed to be portable and do not have built in handles. Additionally, metal security cases can be secured to a fixed location using screws but it is difficult or impossible to remove them from the fixed location. Plastic security cases are easily portable but are not designed to be secure to a fixed location. If placed in a vehicle, neither the metal security case nor the plastic security case has the ability to prevent theft of the container itself. The contents may be secure within the security case but the security case itself can easily be taken and forcibly opened at another location.

The gun security case market does not currently provide a security case that delivers both easy portability and fixed location securement. No security case provides a single data input interface that allows users to easily secure and quickly access security case contents as well as securely fasten and unfasten the security case to multiple fixed location by engaging and disengaging a rail lock.

The present disclosure relates to an improved portable security case that has an innovative securing system. The novel securing system utilizes a data input interface to operate one or more rail locks that allows the security case to be locked shut, as well as allows the security case to be readily fasten and unfasten to a mounting bracket. The sides of the security case are designed with a receiver that integrates with a mounting bracket rail, which, when locked to a fixed location secures the security case and its content. The advanced securing systems allows users freedom and security.

The lid lock secures the lid and security case contents, while the post lock secures the security case to a mounting bracket. The single data input interface allows users to easily secure and quickly access the contents of the security case as well as securely fasten the security case to multiple fixed locations by engaging and disengaging the post lock that integrates with the mounting bracket.

In various exemplary embodiments, the security case includes a base composed of four sides and a bottom wall. The base is connected to a lid with one or more hinges that allow the lid to swing away from the base and when closed the two components can be locked, thus securing the contents. Conventional security cases do not provide the ability to engage and disengage the security case from a mounting bracket and to lock and unlock the security case into a secure fixed mounting bracket with the use of a post lock that is controlled by data input interface built into the security case.

To overcome the limitations of existing security case design and technology as cited above and others, the current security case has integrated mounting brackets that after entering the proper authorization sequence utilizing the single data input interface (e.g. key, numerical digital pad, biometric reader, RFD, or voice recognition, etc.), located on the security case (e.g. handle) the user can select to independently lock/unlock the security case and secure/unsecure the contents within, or select to lock and attach, or unlock and detach the security case itself from a fixed mounting bracket. Thus, allowing the user to ensure the contents are securely locked within the security case, yet giving the user the ability to safely secure the security case to a fixed location.

After initiating the proper authorization sequence, and selecting only to unlock the security case, the user would have instant access to the security case contents while the security case itself would be secured to a fixed mounting bracket. By selecting only to unlock the security case from the fixed mounting bracket the user could maintain the integrity and security of the contents yet safely transport the security case from one fixed location to another. The contents of the security case would remain safely locked within the security case and the user could then transport the security case; and if desired, lock the security case into another mounting bracket at any other location where another mounting bracket was affixed (e.g. vehicle, RV, work shooting range, etc.).

The security case embodies the innovative mounting system that allows a user to lock the security case to a mounting bracket in a secure reliable, efficient, and easy to operate manner. The mounting system consists of two separate components; a receiver that is either built into the security case or can be affixed to the body and a mounting bracket. The receiver and mounting brackets are complementary, in that the receiver slides onto the mounting bracket, whereby the two components can be firmly locked together by a post lock built into the body.

In various exemplary embodiments, the receiver may optionally be fully integrated into the body. In another embodiment, a receiver component may optionally be attached or affixed to the exterior of the body and is designed to allow the receiver to be interchangeable. This interchangeable embodiment would allow for more options related to material, design, color, etc. The interchangeable receiver can be attached or affixed to the exterior of the body using fasteners, such as screws or nuts and bolts.

In yet another embodiment of the present disclosure, the mounting bracket may optionally be fashion in various configuration to accept the security case receiver. The mounting bracket in one embodiment could have fixed rails and in another embodiment the rails could be interchangeable to allow flexibility in material, design or color depending on the user's needs. The mounting bracket optionally utilize a male and female component. The male or female components may be used on either the body or the mounting bracket depending on the embodiment.

In a further embodiment of the mounting system, the bracket components could be configured in a fashion to accept multiple stacked or parallel security cases. Bracket components capable of integrating with the receiver could be used in conjunction with each other.

In various exemplary, non-limiting embodiments, the secure mounting system for a security case of the present disclosure comprises at least some of a security case having a base, wherein a cavity having an open top portion is defined within at least a portion of the base, a lid pivotably attached or coupled to at least a portion of the base via at least one hinge, wherein the lid is pivotable between an open position and a closed position, wherein in the closed position the lid covers the cavity, wherein a lid latch extends from at least a portion of the lid, wherein a receiver extends from each of two opposing exterior sides of the base, and wherein an elongate receiver groove extends along each of the receivers; a lid lock attached or coupled to the base, wherein the lid lock includes a locking latch that is movable between an engaged position and a disengaged position, wherein in the engaged position the locking latch engages the lid latch when the lid is in the closed position to assist in maintaining the lid in the closed position, and wherein a latch solenoid at least moves the lid latch to the disengaged position; a mounting bracket having a bottom portion and two extending arms, wherein each of the extending arms extends from an opposing end portion of the bottom portion, a rail element extending from an interior surface of each extending arm, wherein each rail element is formed so as to engage a respective elongate receiver groove and be slidably received within the respective elongate receiver grooves; a locking post extending from the bottom portion of the mounting bracket and a locking post aperture formed through a portion of the base, wherein at least a portion of the locking post is receivable within at least a portion of the locking post aperture when the security case is positioned within the mounting bracket, such that each of the respective rail elements is slidably received within the respective elongate receiver groove; a post lock included in the base, wherein the post lock includes a post latch that is movable between an engaged position and a disengaged position, wherein in the engaged position the post latch engages at least a portion of the locking post when the locking post is positioned within the locking post aperture to assist in maintaining the security case within the mounting bracket, and wherein a lock solenoid at least moves the post latch to the disengaged position; and a controller electrically connected to a data input interface, wherein the controller is electrically connected to the lid lock and the post lock such that one or more inputs from the data input interface are received by the controller to control the latch solenoid to at least move the lid latch to the disengaged position and/or to control the lock solenoid to at least move the post latch to the disengaged position.

In various exemplary, nonlimiting embodiments, a handle is formed in a portion of the base.

In various exemplary, nonlimiting embodiments, the at least one hinge includes at least one spring biasing element such that the lid is spring biased to the open position.

In various exemplary, nonlimiting embodiments, the lid is spring biased to the open position.

In various exemplary, nonlimiting embodiments, the receivers are removably attached or coupled to the base.

In various exemplary, nonlimiting embodiments, the receivers are formed as an integral portion of the base.

In various exemplary, nonlimiting embodiments, the elongate receiver groove extends along a longitudinal axis of the receiver.

In various exemplary, nonlimiting embodiments, the receiver groove is formed of a substantially picatinny or dovetail shaped receiver groove.

In various exemplary, nonlimiting embodiments, and the disengaged position, the lid lock does not engage the lid latch.

In various exemplary, nonlimiting embodiments, the latch solenoid controls the lid latch to move between the engaged position and the disengaged position.

In various exemplary, nonlimiting embodiments, the mounting bracket comprises a substantially "U" shaped bracket.

In various exemplary, nonlimiting embodiments, each of the rail elements is removably attached or coupled of one of the extending arms.

In various exemplary, nonlimiting embodiments, each of the rail elements is formed as an integral portion of one of the extending arms.

In various exemplary, nonlimiting embodiments, each of the rail elements is formed of a substantially picatinny or dovetail shaped receiver element.

In various exemplary, nonlimiting embodiments, the secure mounting system further includes a rail lock positioned on one or both of the sides of the body, wherein the rail lock includes a movable pin that is movable between an extended position and a retracted position, wherein in the extended position at least a portion of the movable pin passes through a pin aperture in a side of the body and extends so as to engage a portion of the rail element, and wherein the rail lock is electrically connected to the controller such that the controller controls the rail lock to move the movable pin between the extended position and the retracted position.

In various exemplary, nonlimiting embodiments, the controller simultaneously controls both the latch solenoid to at least move the lid latch to the disengaged position and the lock solenoid to at least move the post latch to the disengaged position.

In various exemplary, non-limiting embodiments, the secure mounting system for a security case of the present disclosure comprises at least some of a security case having a base, wherein a cavity having an open top portion is defined within at least a portion of the base, a lid hingedly attached or coupled to at least a portion of the base such that the lid is pivotable between an open position and a closed position, wherein in the closed position the lid covers the cavity, wherein a lid latch extends from at least a portion of the lid, wherein a receiver extends from each of two opposing exterior sides of the base, and wherein an elongate receiver groove extends along each of the receivers; a lid lock attached or coupled to the base, wherein the lid lock includes a locking latch that is movable between an engaged position and a disengaged position, wherein in the engaged position the locking latch engages the lid latch when the lid is in the closed position to assist in maintaining the lid in the closed position, and wherein a latch solenoid at least moves the lid latch between the engaged position and the disengaged position; a mounting bracket having a bottom portion and two extending arms, wherein each of the extending arms extends from an opposing end portion of the bottom portion, a rail element extending from an interior surface of each extending arm, wherein each rail element is formed so as to be slidably received within one of the elongate receiver grooves; a locking post extending from the bottom portion of the mounting bracket and a locking post aperture formed through a portion of the base, wherein at least a portion of the locking post is receivable through the locking post aperture when the security case is positioned within the mounting bracket, such that each of the respective rail elements is slidably received within the respective elongate receiver groove; a post lock included in the base, wherein the post lock includes a post latch that is movable between an engaged position and a disengaged position, wherein in the engaged position the post latch engages at least a portion of the locking post when the locking post extends through the locking post aperture to assist in maintaining the security case within the mounting bracket, and wherein a lock solenoid moves the post latch between the engaged position and the disengaged position; a controller electrically connected to a data input interface, wherein the controller is electrically connected to the lid lock and the post lock such that one or more inputs from the data input interface are received by the controller to simultaneously or independently control the latch solenoid to move the lid latch to the disengaged position and/or to control the lock solenoid to at least move the post latch to the disengaged position.

In various exemplary, non-limiting embodiments, the secure mounting system for a security case of the present disclosure comprises at least some of a security case having a base, wherein a cavity is defined within at least a portion of the base, a lid pivotably attached or coupled to at least a portion of the base via at least one hinge, wherein the lid is pivotable between an open position and a closed position, wherein the lid is spring biased to the open position, wherein in the closed position the lid covers the cavity, wherein a lid latch extends from at least a portion of the lid, wherein a receiver extends from each of two opposing exterior sides of the base, and wherein an elongate receiver groove extends along each of the receivers; a lid lock attached or coupled to the base, wherein the lid lock includes a locking latch that is movable between an engaged position and a disengaged position, wherein in the engaged position the locking latch engages the lid latch when the lid is in the closed position to assist in maintaining the lid in the closed position, and wherein a latch solenoid at least moves the lid latch between the engaged position and the disengaged position; a mounting bracket having a bottom portion and two extending arms, wherein each of the extending arms extends from an opposing end portion of the bottom portion, a rail element extending from an interior surface of each extending arm, wherein each rail element is mateable with the elongate receiver grooves so as to be slidably received within one of the elongate receiver grooves; a locking post extending from the bottom portion of the mounting bracket and a locking post aperture formed through a portion of the base, wherein at least a portion of the locking post is receivable through the locking post aperture when the security case is positioned within the mounting bracket, such that each of the respective rail elements is slidably received within the respective elongate receiver groove; a post lock included in the base, wherein the post lock includes a post latch that is movable between an engaged position and a disengaged position, wherein in the engaged position the post latch engages at least a portion of the locking post when the locking post extends through the locking post aperture to assist in maintaining the security case within the mounting bracket, and wherein a lock solenoid moves the post latch between the engaged position and the disengaged position; a rail lock positioned on one or both of the sides of the body, wherein the rail lock includes a movable pin that is movable between an extended position and a retracted position, wherein in the extended position at least a portion of the movable pin passes through a pin aperture in a side of the body and extends so as to engage a portion of the rail element; and a controller electrically connected to a data input interface, wherein the controller is electrically connected to the lid lock, the post lock, and the rail lock such that one or more inputs from the data input interface are received by the controller to simultaneously or independently control the latch solenoid to move the lid latch to the disengaged position, to control the lock solenoid to at least move the post latch to the disengaged position, and/or to control the rail lock to at least move the movable pin between the extended position and the retracted position.

Accordingly, the present disclosure provides a security case that can be readily fasten and unfasten to an external fixed mounting bracket.

The present disclosure separately provides a security case that provides a single data input interface to operate separate locking mechanisms, allowing the security case to be locked and/or allowing the security case to be locked or unlocked to an external fixed mounting bracket.

The present disclosure separately provides a security case that allows a user to easily secure and unsecure the security case to multiple fixed locations.

The present disclosure separately provides a security case that provides access to security case contents and allows the user to easily secure the security case from one fixed location to another fixed location.

These and other aspects, features, and advantages of the present disclosure are described in or are apparent from the following detailed description of the exemplary, non-limiting embodiments of the present disclosure and the accompanying figures. Other aspects and features of embodiments of the present disclosure will become apparent to those of ordinary skill in the art upon reviewing the following description of specific, exemplary embodiments of the present disclosure in concert with the figures. While features of the present disclosure may be discussed relative to certain embodiments and figures, all embodiments of the present disclosure can include one or more of the features discussed herein.

Further, while one or more embodiments may be discussed as having certain advantageous features, one or more of such features may also be used with the various embodiments of the systems, methods, and/or apparatuses discussed herein. In similar fashion, while exemplary embodiments may be discussed below as device, system, or method embodiments, it is to be understood that such exemplary embodiments can be implemented in various devices, systems, and methods of the present disclosure.

Any benefits, advantages, or solutions to problems that are described herein with regard to specific embodiments are not intended to be construed as a critical, required, or essential feature(s) or element(s) of the present disclosure or the claims.

BRIEF DESCRIPTION OF THE SEVERAL VIEWS OF THE DRAWINGS

As required, detailed exemplary embodiments of the present disclosure are disclosed herein. However, it is to be understood that the disclosed embodiments are merely exemplary of the present disclosure that may be embodied in various and alternative forms, within the scope of the present disclosure. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the present disclosure.

The exemplary embodiments of the present disclosure will be described in detail, with reference to the following figures, wherein like reference numerals refer to like parts throughout the several views, and wherein.

DETAILED DESCRIPTION OF EXEMPLARY EMBODIMENTS OF THE INVENTION

Figure 1:
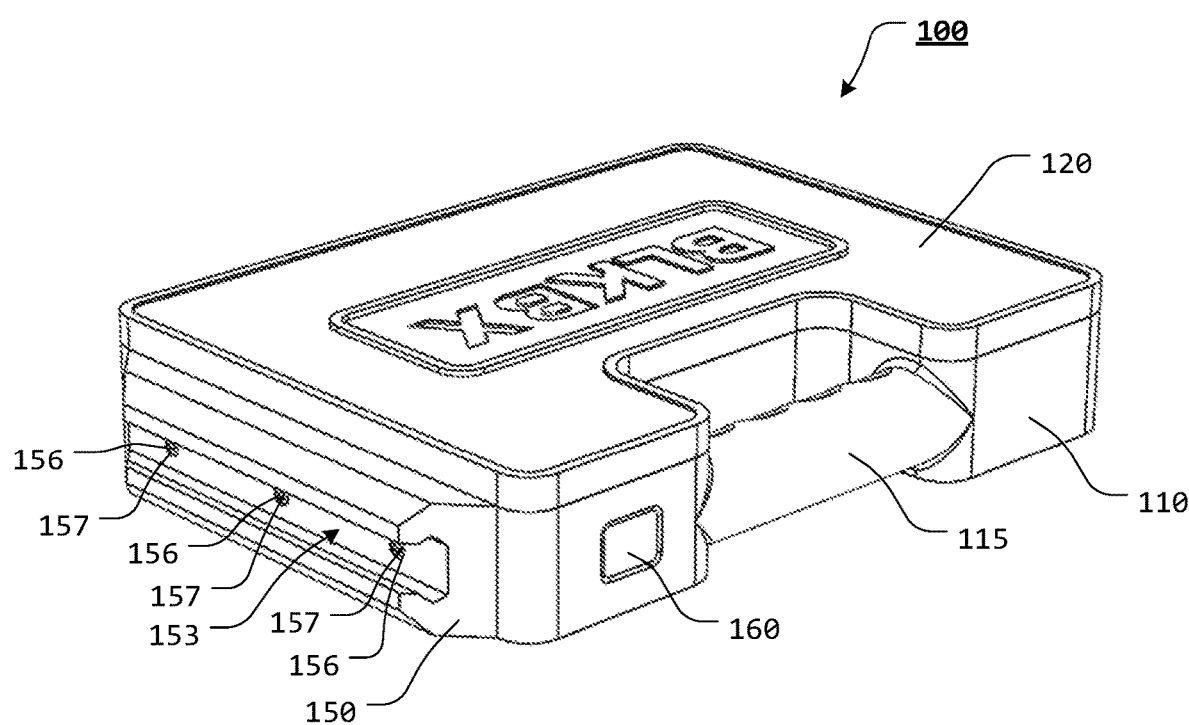
FIG. 1 illustrates an upper, front, left perspective view of an exemplary embodiment of a security case, according to the present disclosure.

For simplicity and clarification, the design factors and operating principles of the security case and mounting bracket are explained with reference to various exemplary embodiments of a security case and mounting bracket according to the present disclosure. The basic explanation of the design factors and operating principles of the security case and mounting bracket is applicable for the understanding, design, and operation of the security case and mounting bracket of the present disclosure. It should be appreciated that the security case and mounting bracket can be adapted to applications where a packaging element can be used.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the exemplary embodiments and/or elements such terms describe. Thus, these terms are not necessarily intended to indicate temporal or other prioritization of such exemplary embodiments and/or elements.

The term "coupled", as used herein, is defined as connected, although not necessarily directly, and not necessarily mechanically. The terms "a" and "an" are defined as one or more unless stated otherwise.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that the terms "security case" and "mounting bracket" are used for basic explanation and understanding of the operation of the systems, methods, and apparatuses of the present disclosure. Therefore, the terms "security case" and "mounting bracket" are not to be construed as limiting the systems, methods, and apparatuses of the present disclosure. Additionally, the term "security case" is used to represent any device, such as a vault, safe, strong box, gun safe, locked cabinet, locked drawer, etc., that is used to store items and reduce the possibility of loss of the items to theft, accidental access, fire, etc. The possibility of loss or accidental access is reduced by making the security case resist removal from the mounting bracket, tamper resistant, sturdy, portable, yet secure, etc.

Turning now to the appended drawing figures, FIGS. 1-23 illustrate certain elements and/or aspects of various exemplary embodiments of a security case 100, according to the present disclosure.

In illustrative, non-limiting embodiment(s) of the present disclosure, as illustrated most clearly in FIGS. 1-23, the security case 100 comprises a base 110 having a bottom wall and one or more sidewalls extending from the bottom wall to define a cavity 113 having an open top portion 114. A lid 120 is attached or coupled to the base 110, via one or more hinges 117. A carry handle 115 is formed in or extends from at least a portion of the base 110.

Figure 2:
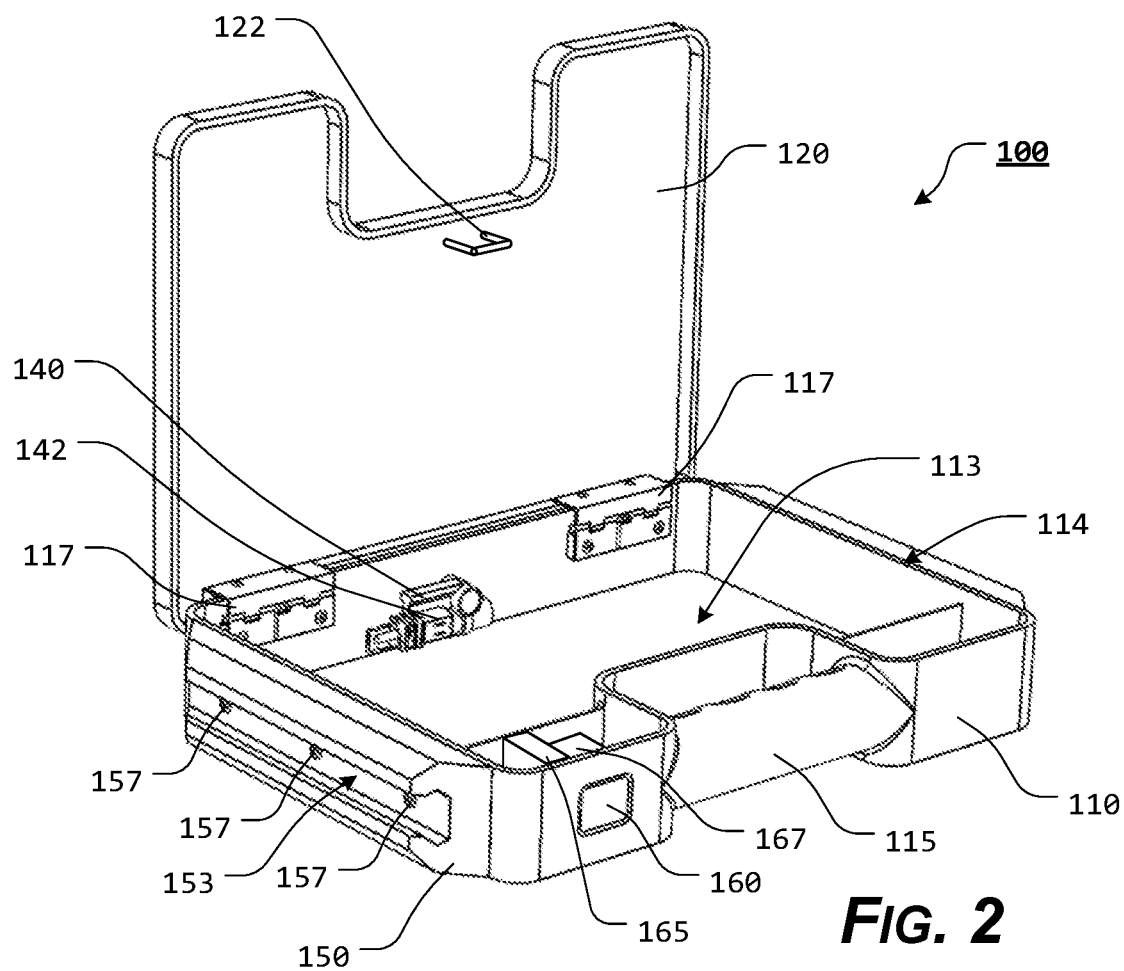
FIG. 2 illustrates an upper, front, left perspective view of an exemplary embodiment of a security case, wherein the security case is in an opened position, according to the present disclosure.
Figure 3:
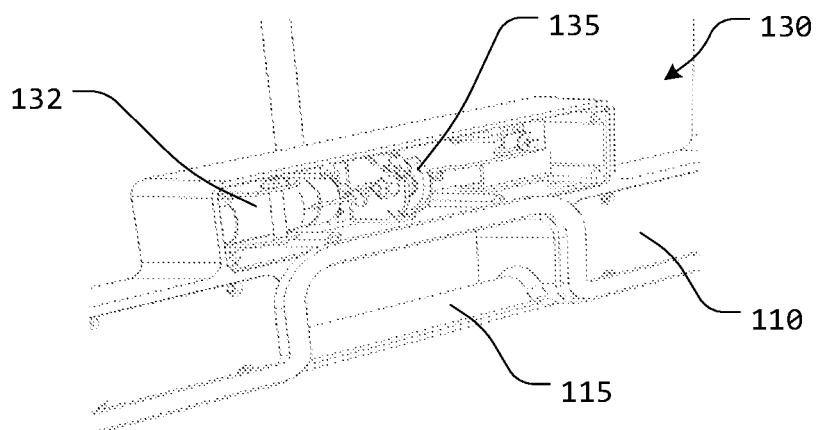
FIG. 3 illustrates a more detailed perspective view of an exemplary embodiment of a security case in an opened position, illustrating an exemplary lid lock that allows the lid to be locked in a closed position, according to the present disclosure.
Figure 4:
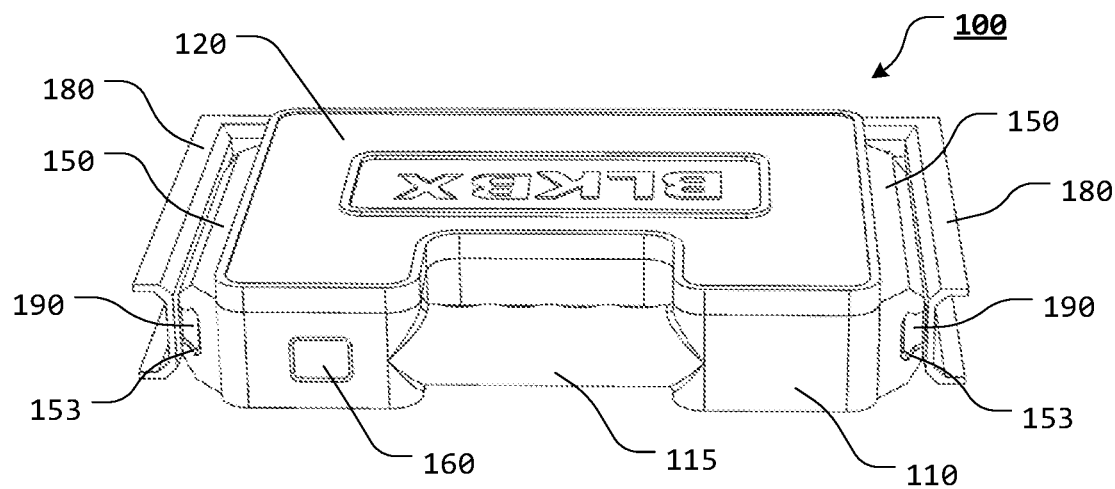
FIG. 4 illustrates an upper front view of an exemplary embodiment of a security case engaged in an exemplary embodiment of a mounting bracket, according to the present disclosure.
Figure 5:
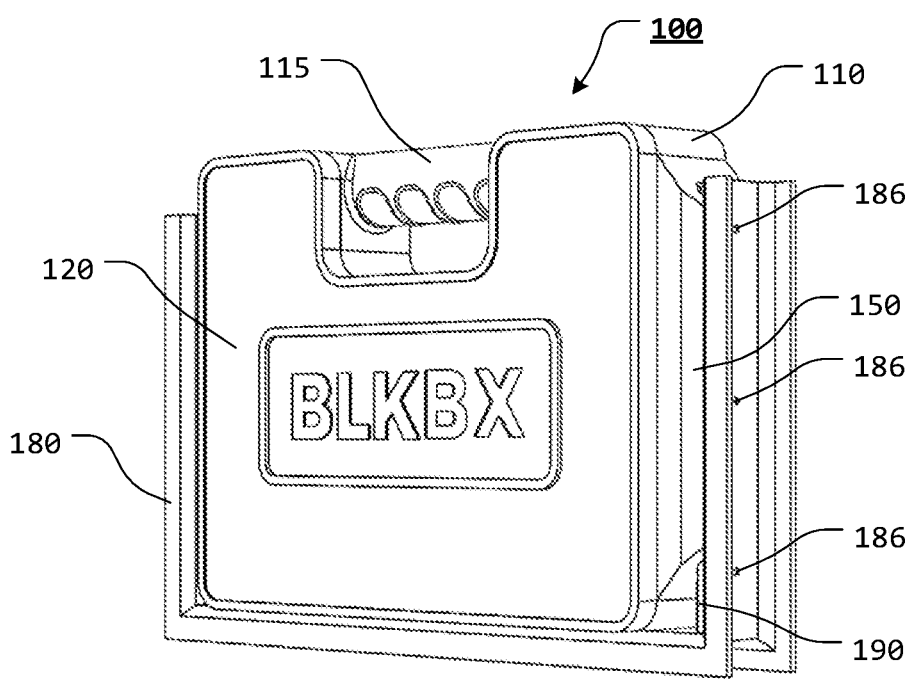
FIG. 5 illustrates a top side view of an exemplary embodiment of a security case engaged in an exemplary embodiment of a mounting bracket, according to the present disclosure.
Figure 6:
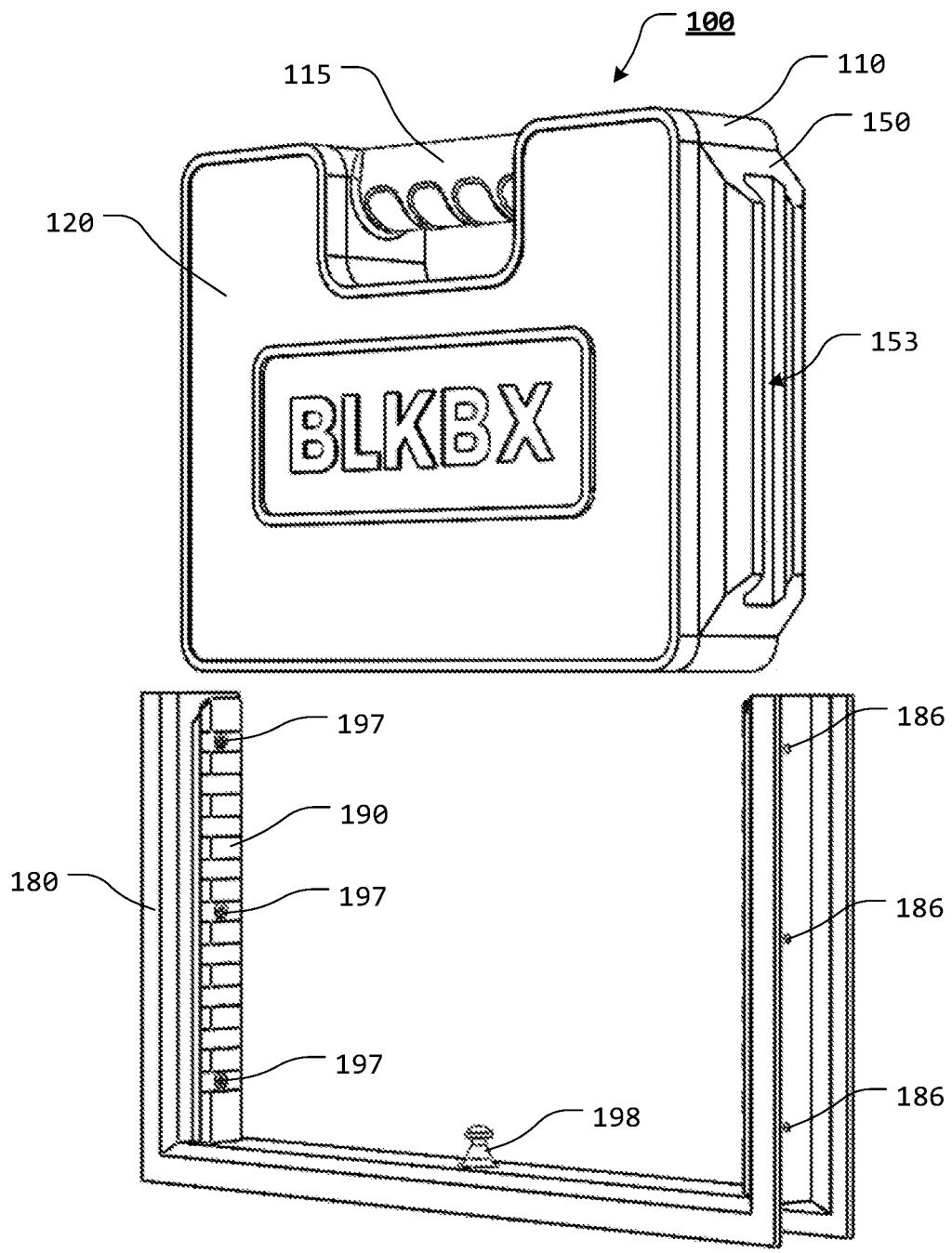
FIG. 6 illustrates a top side view of an exemplary embodiment of a security case aligned with an exemplary embodiment of a mounting bracket, according to the present disclosure.
Figure 7:
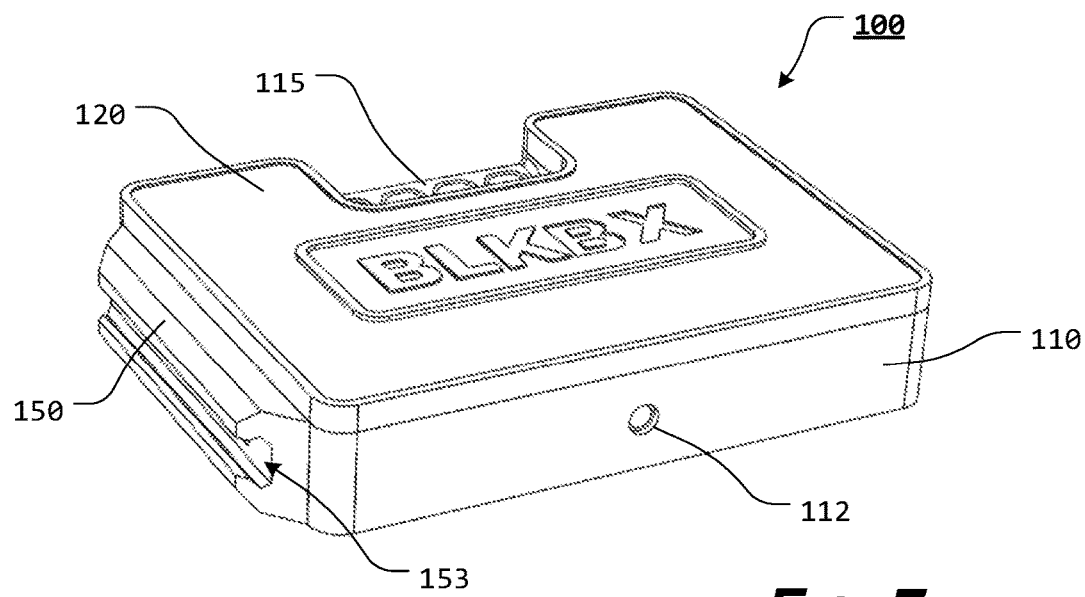
FIG. 7 illustrates a rear view of an exemplary embodiment of a security case, according to the present disclosure.
Figure 8:
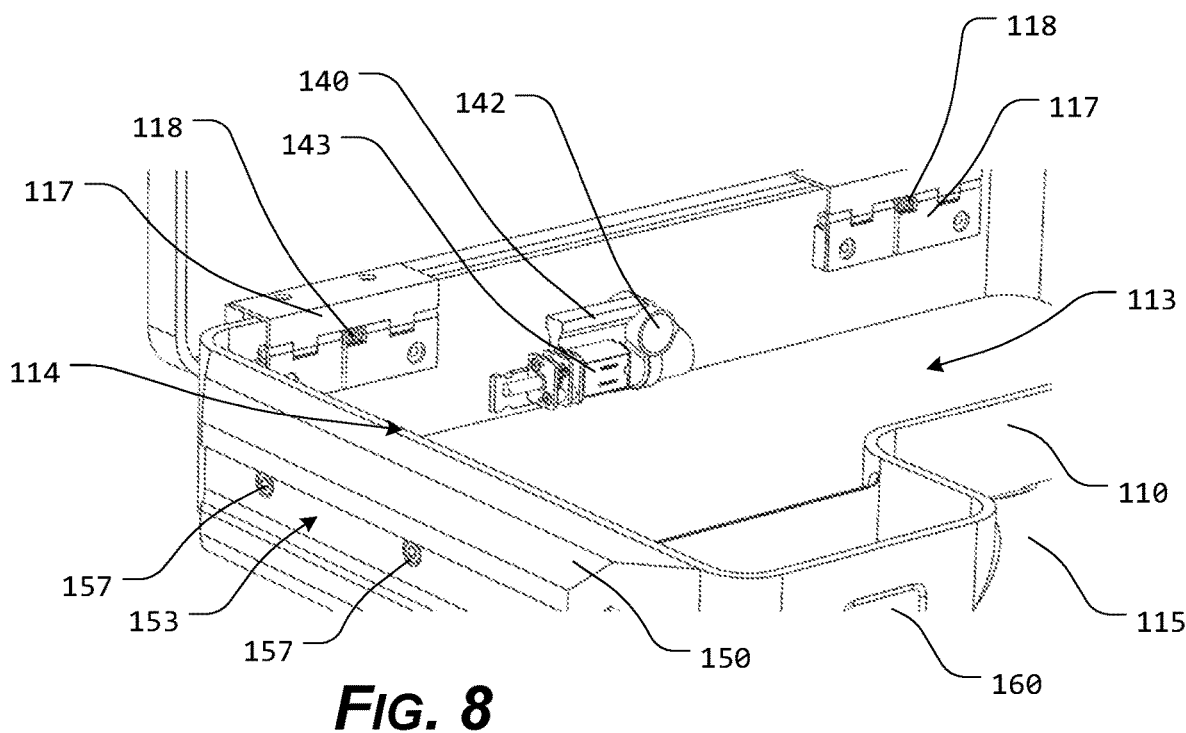
FIG. 8 illustrates a more detailed upper, front, left perspective view of an exemplary embodiment of a security case, wherein the security case is in an opened position, according to the present disclosure.
Figure 9:
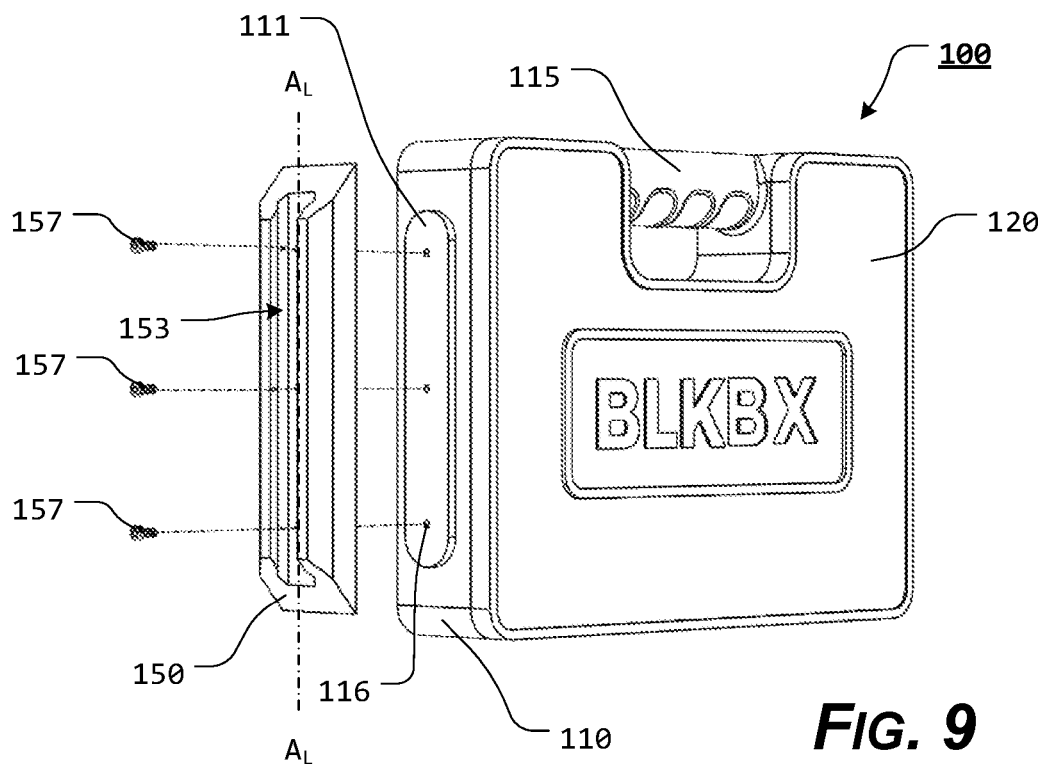
FIG. 9 illustrates a top side view of an exemplary embodiment of an interchangeable receiver aligned with an exemplary embodiment of a security case, according to the present disclosure.
Figure 10:
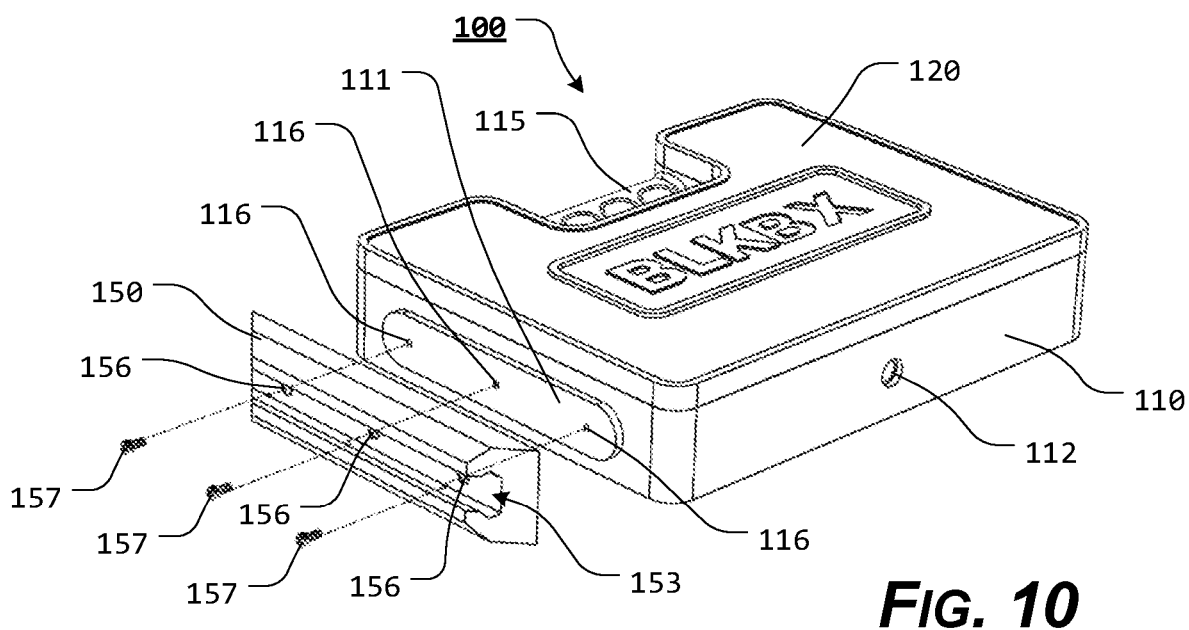
FIG. 10 illustrates an upper, rear, side view of an exemplary embodiment of an interchangeable receiver aligned with an exemplary embodiment of a security case, according to the present disclosure.

The lid 120 is hingedly attached or coupled to the base 110 so as to be positionable between a closed position, as illustrated, for example, in FIG. 1, and an open position, as illustrated, for example, in FIG. 2. In the open position, the cavity 113 is accessible so that items can be deposited within or removed from the cavity 113. In the closed position, at least a portion of the lid 120 contacts the open top portion 114 and covers the cavity 113.

In certain exemplary embodiments, the hinges 117 include at least one spring biasing element 118. In certain exemplary embodiments, the spring biasing element 118 comprises a torsion spring. Alternatively, the spring biasing element 118 may comprise other types of spring/energy storage mechanisms, including, but not limited to coil or torsion springs, opposing magnetic poles, gas assist struts, etc. by incorporating a spring biasing element 118 into one or more of the hinges 117, the lid 120 may be spring biased to the open position, such that when the lid lock is released, the spring-loaded hinges 117, the spring-loaded hinges 117 urge the lid 120 to the open position, providing quick access to the cavity 113 and any contents therein.

Various components of the security case 100 (including the base 110 and the lid 120) may optionally be injection molded, rotation molded, blow-molded, extruded, and/or pultruded. Alternatively, various components of the security case 100 (including the base 110 and the lid 120) may optionally be formed of stamped, cast, and/or forged metals. The metals could include hardened steel, stainless steel and/or other metals. The components of the security case 100 may optionally be produced in various and different colors (e.g., black, grey, red, green, yellow, blue, pink, sliver, etc.) and is both durable and rugged in design.

In some embodiments, the security case 100 may optionally be relatively small, just large enough to hold a single handgun and magazine. Alternatively, the security case 100 may optionally be comparatively larger to accommodate rifles, long guns, or even bows security cases. However, it should be appreciated that the security case 100 of the present disclosure is not limited to such exemplary embodiments and other embodiments of various sizes and shapes can also be used to implement the invention. Thus, it should be appreciated that the overall size and/or shape of the security case 100 and/or the cavity 113 is a design choice based upon the size or number of items that may be stored within the cavity 113.

A lid lock 130 is included within the base 110. The lid lock 130 includes a locking latch 135 and may optionally be controlled by a latch motor or latch solenoid 132. The locking latch 135 can be manipulated between an engaged and a disengaged position. In the engaged position, the locking latch 135 interacts with at least a portion of a lid latch 122 (attached to or extending from a portion of the lid 120), to maintain the lid 120 in a closed and locked position, relative to the base 110. In the disengaged position, the locking latch 135 does not engage the lid latch 122 and the lid 120 is able to be rotated to the open position, relative to the base 110.

In various exemplary embodiments, the latch solenoid 132 manipulates the locking latch 135, between the engaged in the disengaged position. In certain alternative embodiments, the latch solenoid 132 merely operates to release the locking latch 135. In these exemplary embodiments, closure of the lid 120 forces the lid latch 122 to engage the locking latch 135 and urges the locking latch 135 to the engaged position. Thus, physical closure of the lid 120 mechanically urges the locking latch 135 to the engaged position, while activation of the latch solenoid 132 merely allows the locking latch 135 to move to the disengaged position.

In certain exemplary embodiments, the lid lock 130 secures the lid 120 to the base 110 upon authorization for the data input interface 160, which would allow the lid lock 130 to engage and disengage.

In order to allow the security case 100 to be releasably mounted to a mounting bracket 180, in various exemplary embodiments, a receiver 150 is formed in or extends from opposing exterior sides of the base 110. Each receiver 150 includes an elongate receiver groove 153 that extends along the longitudinal axis, $A_L$, of the receiver 150. In various exemplary embodiments, the receiver groove 153 is formed of a substantially picatinny or dovetail shaped receiver groove 153.

In certain exemplary embodiments, the receivers 150 are formed as an integral portion of the base 110. Alternatively, the receivers 150 are formed of separate components and are attached or coupled to a portion of the base 110. In these exemplary embodiments, as illustrated most clearly in FIGS. 9 and 10, each receiver 150 includes one or more apertures 156 formed through a portion of the base 110. Each of the one or more apertures 156 is alignable with an aperture 116 formed through a portion of the base 110. When appropriately aligned, a fastener 157 is positioned through the aligned rail apertures 156 and base apertures 116 and is capable of securing the receiver 150 to a portion of the base 110.

In certain exemplary embodiments, a projection 111 extends from a portion of each exterior side wall of the base 110 and is alignable with a mating recess formed in each receiver 150. If included, the mating projections and recesses allow each receiver 150 to be maintained in a desired position relative to the exterior side wall portions of the base 110.

Each rail element 190 has a rail projection portion 193 that extend from opposing sides of the rail element 190 and each receiver 150 is formed with a receiver groove 153, which slidably mates with the rail projection portion 193. For example, in certain exemplary embodiments, the rail projection portion 193 may optionally be a dovetail rail projection portion 193 and the receiver groove 153 in the receiver 150 is a mating, dovetailed receiver groove 153. More specifically, the illustrated rail projection portion 193 is a picatinny rail projection portion 193 and the receiver groove 153 in the receiver 150 is a picatinny receiver groove 153.

In certain exemplary embodiments, the rail element 190 comprises a portion of material that is undercut, along a longitudinal axis, $A_L$, to form a "flattened T" with a hexagonal top cross-section. Cross slots interspersed along the entire length with flats formed at regular intervals that allow the receiver groove 153 to be slid into place from an end of the rail element 190 and then locked in place.

Figure 11:
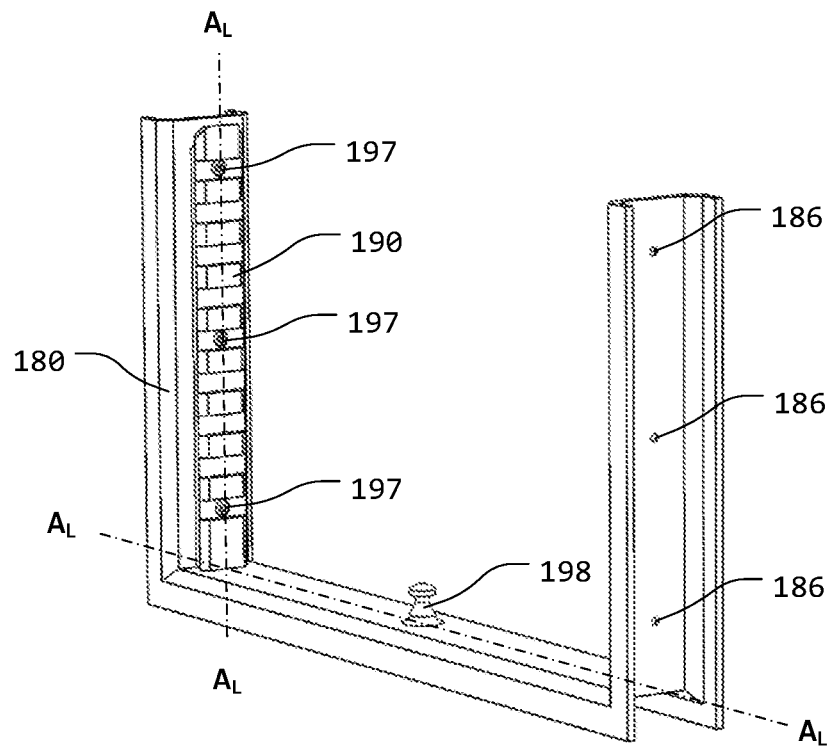
FIG. 11 illustrates a top side view of an exemplary embodiment of a mounting bracket, according to the present disclosure.
Figure 12:
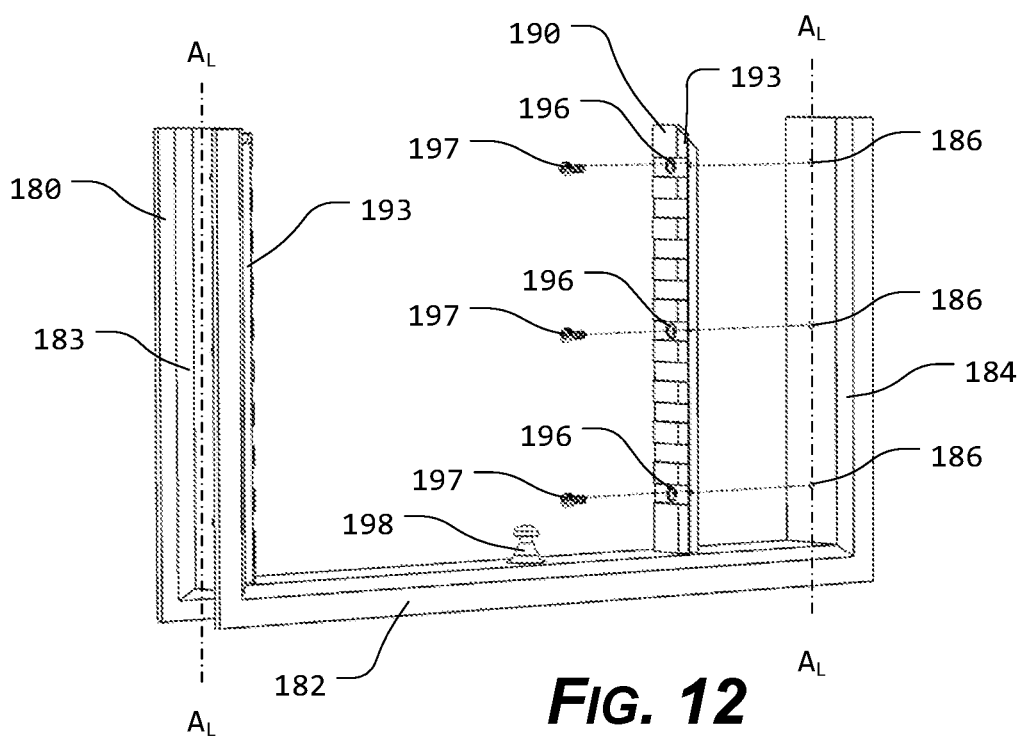
FIG. 12 illustrates a top side view of an exemplary embodiment of an interchangeable rail aligned with an exemplary embodiment of a mounting bracket, according to the present disclosure.

As illustrated most clearly in FIGS. 11 and 12, the mounting bracket 180 comprises a substantially "U" shaped bracket having a bottom portion 182 and two extending arms 183 and 184. Each of the extending arms 183 and 184 extend from opposing ends of the bottom portion 182, forming an angle of approximately 90° between a longitudinal axis of the bottom portion 182 and a longitudinal axis of each of the respective extending arms 183 and 184.

The bottom portion 182 is sized so as to allow the extending arms 183 and 184 to be spaced apart at a distance substantially slightly greater than a width of the body 110. In this manner, each of the rail elements 190, when attached or coupled two extending arms 183 and 184 is positioned so as to engage a respective receiver groove 153 of the base 110.

In certain exemplary embodiments, the rail elements 190 are formed as an integral portion of opposing interior surfaces of the extending arms 183 and 184. Alternatively, the rail elements 190 are formed of separate components and are attached or coupled to opposing interior surfaces of the extending arms 183 and 184. In these exemplary embodiments, as illustrated most clearly in FIGS. 11 and 12, each extending arms 183 and 184 includes one or more wall apertures 186 formed through a portion of the respective wall portion 183 or 184. Each of the one or more wall apertures 186 is alignable with a rail aperture 196 formed through a portion of each rail element 190. When appropriately aligned, a fastener 197 is positioned through the aligned rail apertures 196 and wall apertures 186 and is capable of securing the rail element 190 to a portion of the respective wall portion 183 or 184.

The mounting bracket 180 may be secured or mounted to a surface or item. The security case 100 may then be positioned and secured within the mounting bracket 180 to secure the security case 100 to the surface or item. In order to secure the security case 100 within the mounting bracket 180, the security case 100 is initially aligned with the mounting bracket 180 such that the respective receiver grooves 153 are aligned with respective rail members 190. Once appropriately aligned, the security case is urged toward the mounting bracket 180 such that the rail members 190 are slidably received within the receiver grooves 153. Once appropriately positioned within the receiver grooves 153, interaction between the receivers 150 and the rail members 190 (and more specifically interaction between the receiver grooves 153 and the rail protrusions 193) maintain the security case 100 within at least a portion of the mounting bracket 180.

The mounting bracket 180 may optionally be permanently secured to a fixed location using conventional screws or nuts and bolts. Mounting brackets 180 can be affixed to any location, under a car seat, in a truck bed, to a bed frame, under a desk or anywhere the user desires.

Figure 22:
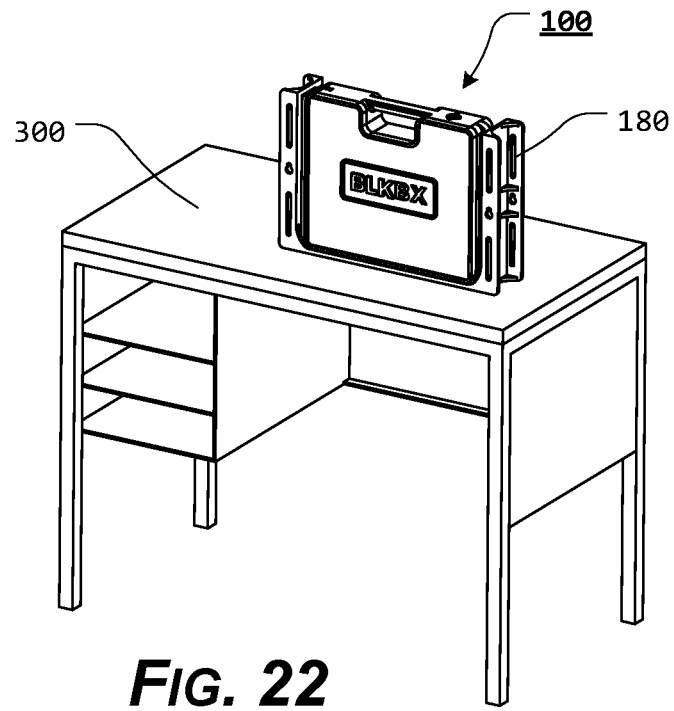
FIG. 22 illustrates an exemplary embodiment of a security case and an exemplary embodiment of a mounting bracket attached or coupled to a desk, according to the present disclosure.
Figure 23:
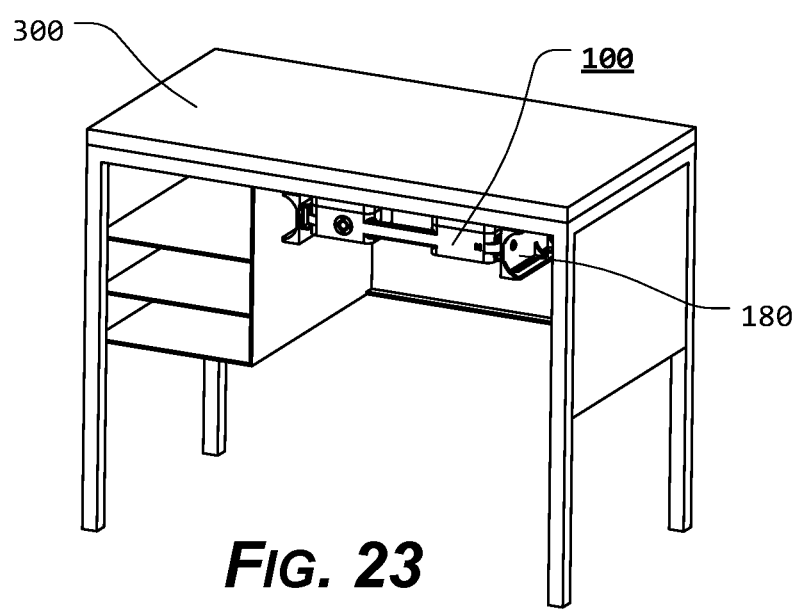
FIG. 23 illustrates an exemplary embodiment of a security case and an exemplary embodiment of a mounting bracket attached or coupled to a desk, according to the present disclosure.

In an exemplary embodiment, as illustrated in FIGS. 22 and 23, the mounting bracket 180 may optionally be mounted to a desk 300. The mounting bracket 180 may optionally be mounted in either a vertical or a horizontal position.

While FIGS. 1-13 illustrate receivers 150 attached or coupled to the base 110 and rail elements 190 attached or coupled to the mounting bracket 180, it should be appreciated that the present disclosure is not so limited. For example, as illustrated in FIGS. 19-23, a receiver 250, having a receiver groove 253, may extend from the mounting bracket 180 and a rail 290 may extend from the exterior sides of the base 110.

A locking post 198 may optionally extend from a portion of the bottom portion 182. The locking post 198, if included, extends from the bottom portion 182 and, when the security case 100 is appropriately positioned within the mounting bracket 180, the locking post 198 is aligned with an extends through a locking post aperture 112 formed through a portion of the base 110.

A post lock 140 included in the base 110 accepts a portion of the locking post 198 to secure the locking post 198 to the post lock 140. Thus, when the locking post 198 passes through the base 110, at least a portion of the locking post 198 is securely engaged by the post lock 140, further securing the body 110 to the mounting bracket 180. In various exemplary embodiments, the locking post 198 is designed to be tamper resistant at the locking post aperture 112. The locking post 198 may optionally be constructed with hardened metal, tamper resistant plastic, and/or composite materials.

The post lock 140 includes a post latch 142 and may optionally be controlled by a post lock motor or solenoid 143. The post latch 142 can be manipulated between an engaged and a disengaged position. In the engaged position, the post latch 142 interacts with at least a portion of a locking post 198 (attached to or extending from a portion of the bottom portion 182), to maintain the security case 100 within the mounting bracket 180. In the disengaged position, the post latch 142 does not engage the locking post 198 and the locking post 198 is able to be withdrawn from the post lock 140, allowing the security case 100 to be withdrawn or removed from the mounting bracket 180.

In various exemplary embodiments, the lock solenoid 143 manipulates the post latch 142, between the engaged in the disengaged position. In certain alternative embodiments, the lock solenoid 143 merely operates to release the post latch 142. In these exemplary embodiments, positioning of the security case 100 adjacent or against the bottom portion 182 forces the locking post 198 to engage the post latch 142 and urges the post latch 142 to the engaged position. Thus, physical positioning of the security case 100 relative to the bottom portion 182 mechanically urges the post latch 142 to the engaged position, while activation of the lock solenoid 143 merely allows the post latch 142 to move to the disengaged position.

When the security case 100 is fully engaged into the mounting bracket 180, the locking post 198 passes through the locking post aperture 112 in the base 110 of the security case 100, locking the security case 100 to the mounting bracket 180. Authorized users use the data input interface 160 to unlock the security case 100 from the locking post 198 and transport the security case 100 to another fixed mounting bracket 180.

Figure 13:
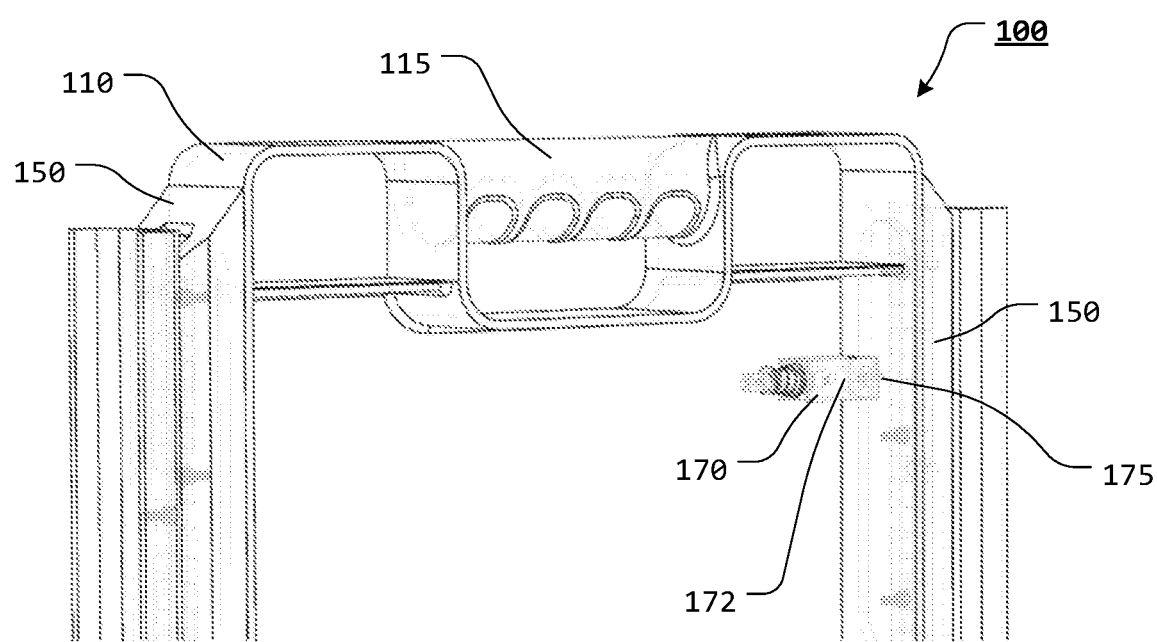
FIG. 13 illustrates a more detailed upper, front, left perspective view of certain portions of an exemplary embodiment of a security case, wherein the security case is in an opened position, illustrating an exemplary solenoid pin-lock that allows the security case to be locked into the mounting bracket, according to the present disclosure.

In certain exemplary embodiments, as illustrated, for example, in FIG. 13, the body 110 comprises a rail lock 170 of a conventional type, positioned on one or both of the sides of the body 110. The rail lock 170 is arranged so that a movable pin 172 of the rail lock 170 is capable of passing through a pin aperture 175 in the side or sides of the body 110. The movable pin 172 is activated to move between a retracted position and an extended position. In the extended position, at least a portion of the movable pin 172 engages a portion of the rail element 190, thus further securing the body 110 to the mounting bracket 180. Activation of the rail lock 170 urges the movable pin 170 to extend to engage a portion of the rail element 190, and resist movement of the receiver 150 (and the security case 100) relative to the rail element 190 (and the mounting bracket 180). Deactivation of the rail lock 170 causes the movable pin 170 to retract to disengage from the rail element 190, allowing movement of the receiver 150 (and the security case 100) relative to the rail element 190 (and the mounting bracket 180).

Thus, when the rail lock 170 is activated, the rail elements 190 are at least partially secured within the respective receiver grooves 153, such that unintentional sliding of the receiver grooves 153 relative to the rail elements 190 is avoided, securing the security case 100 within the mounting bracket 180. When the rail lock 170 is deactivated, the rail elements 190 are able to slide relative to the receiver groove 153, such that the security case 100 can be withdrawn from the mounting bracket 180.

In a further embodiment, the body 110 is equipped with an internal one directional lock-lever mechanism (no shown) positioned on the side of the body 110 that is automatically depressed when the receiver 150 passes over the mounting brackets 180 and at a designated point engages the mounting bracket 180 thus securing the receiver 150 to the mounting bracket 180. Upon authorization for the data input interface 160 the internal lock-lever mechanism could be disengaged to allow the body 110 to slide off the fixed mounting bracket 180.

The embodiments described with respect to the locking mechanism will have manual override systems, such as a key or other manual release mechanism, that in the event of electric malfunction or power failure, a key or manual release mechanism can unlock or release the security case 100.

A data input interface 160 is included in the body 110. The data input interface 160 is positioned in an ergonomic location, i.e., proximate the handle 115. The data input interface 160 is electrically connected to an internal circuit board or controller 165 located in the body 110. A power supply 167, such as, for example, a battery, is also electrically connected to the controller 165. Similarly, the lid lock 130, the post lock 140, and the rail lock(s) 170 are also electrically connected to the controller 165. In this manner, a user is able to provide inputs through the data input interface 160, so as to control the controller 165 to engage or disengage the lid lock 130, the post lock 140, and the rail lock(s) 170.

The data input interface 160 may optionally be one or a combination of a biometric input interface, numeric digital keypad, traditional key access, (not shown), electronic security card (not shown), Smart card (not shown), electronic key fob (not shown), RFID sensor (not shown), voice recognition, (not shown), etc.

All such devices are known in the art and included here within. For example, in one embodiment, the digital input interface 160 incorporates at least one sensor that senses the proximity of a key fob (as used with some newer vehicles), and when the key fob is proximal (e.g. on the nightstand, near the body 110), the controller 165 controls the lid lock 130 to disengage from the lid latch 122, or controlling the lid lock 132 disengage from the lid latch 122 upon a contact with the data input interface 160. In various exemplary embodiments, the controller 165 mechanically operates a locking mechanism such as one or more locking pins when locked, thereby preventing access to the contents of the body 110.

After the correct code, combination, key, biometric scan, etc., is presented to the data input interface 160, the controller 165 controls the lid lock 130, the post lock 140, and the rail lock(s) 170 to permit, for example, disengage the lid lock 130 and permit opening of the lid 120 or disengage the post lock 140 and/or the rail lock(s) 170 to permit removal from the security case 100 from the mounting bracket 180. In some embodiments, disengaging the lid lock 130, the post lock 140, and/or the rail lock(s) 170 allows the user to remove the body 110 from the mounting bracket 180 and obtain access to the contents.

The controller 165, actuated by the data input interface 160, may provide additional security by incorporating a biometric scanner. For example, the data input interface 160 may include a fingerprint reader or other biometric device which is programmed to verify the identity of an authorized used before a command is sent by the controller 165. A digital numeric or mechanical combination lock or similar device may be used with or in addition to the biometric device to prevent unauthorized access to the cavity 113 of the security case 100. Similarly, a conventional key, or other mechanical device may be associated with the security case 100 and/or the controller 165 to provide access if there is a power failure.

Thus, in various exemplary embodiments, after initiating a proper authorization sequence, and selecting only to unlock the security case 100, the user would have access to the cavity 113 of the security case 100, while the security case 100 would remain secured to the mounting bracket 180. By selecting only to unlock the security case 100 from the fixed mounting bracket 180, the user could maintain the integrity and security of the security case 100, yet be able to remove the security case 100 from the mounting bracket 180 and transport the security case 100 from one fixed location to another. Once at the next location, the security case 100 may be attached or coupled to another mounting bracket 180 to be secured at that location.

Figure 14:
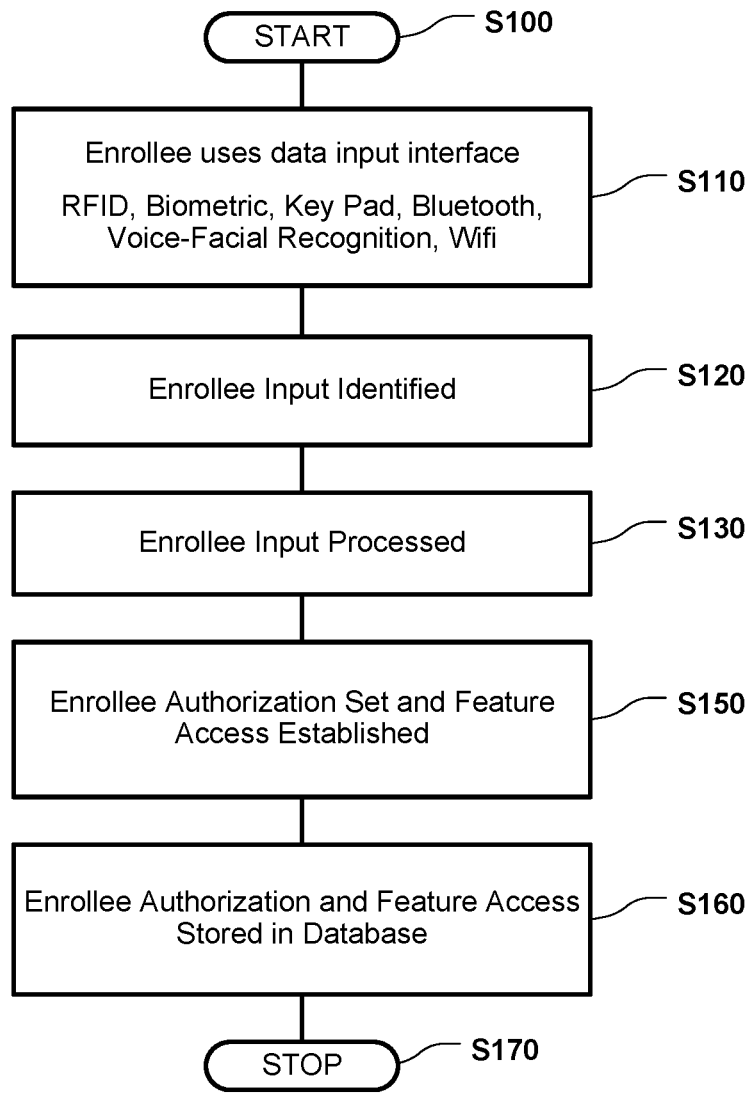
FIG. 14 illustrates a flowchart outlining exemplary steps for registering a user to use the security case and establishing security case access options for the user, according to the present disclosure.
Figure 15:
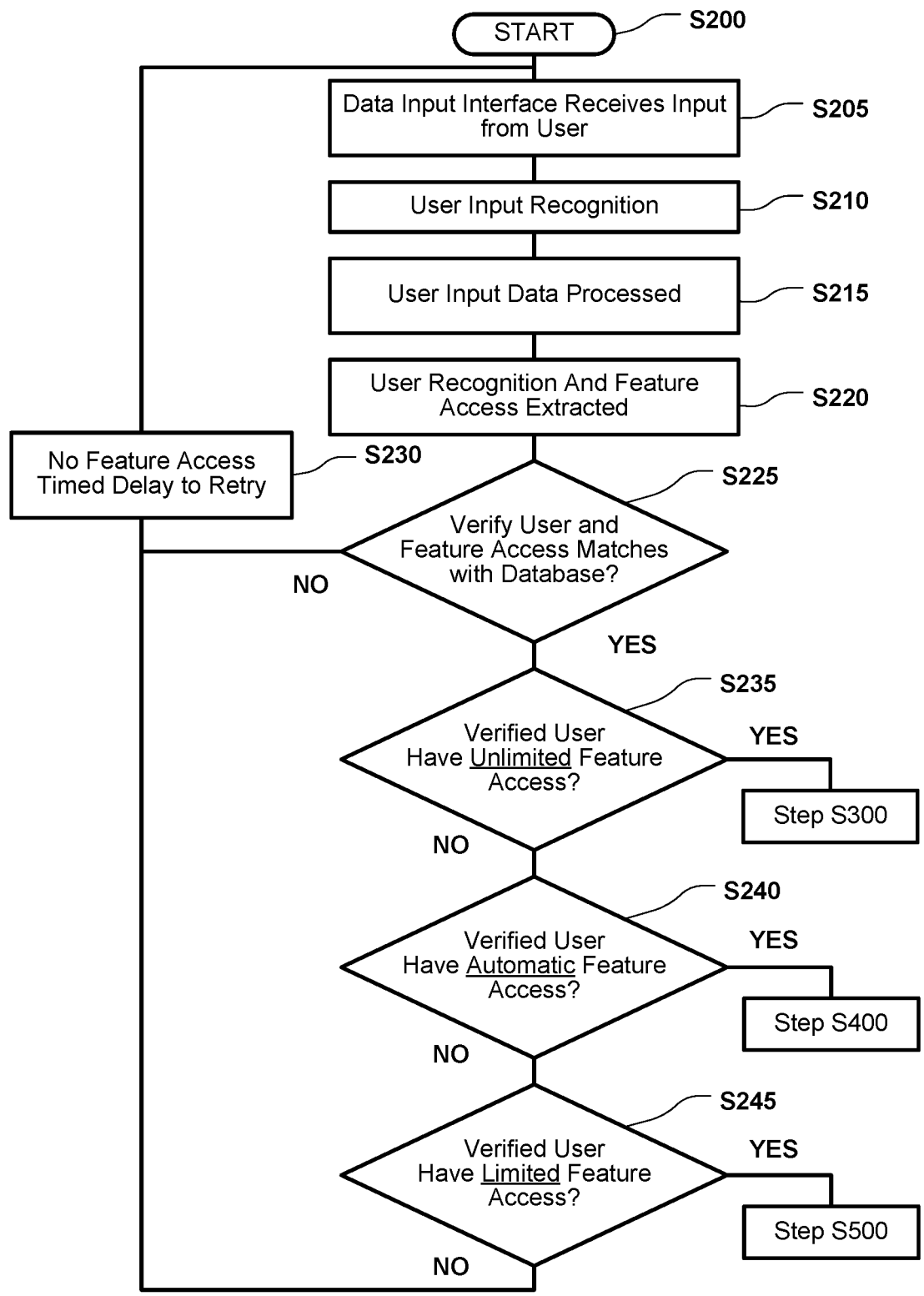
FIG. 15 illustrates a flowchart outlining exemplary steps for allowing a user to use the security case and access the security case based on established access options for the user, according to the present disclosure.
Figure 16:
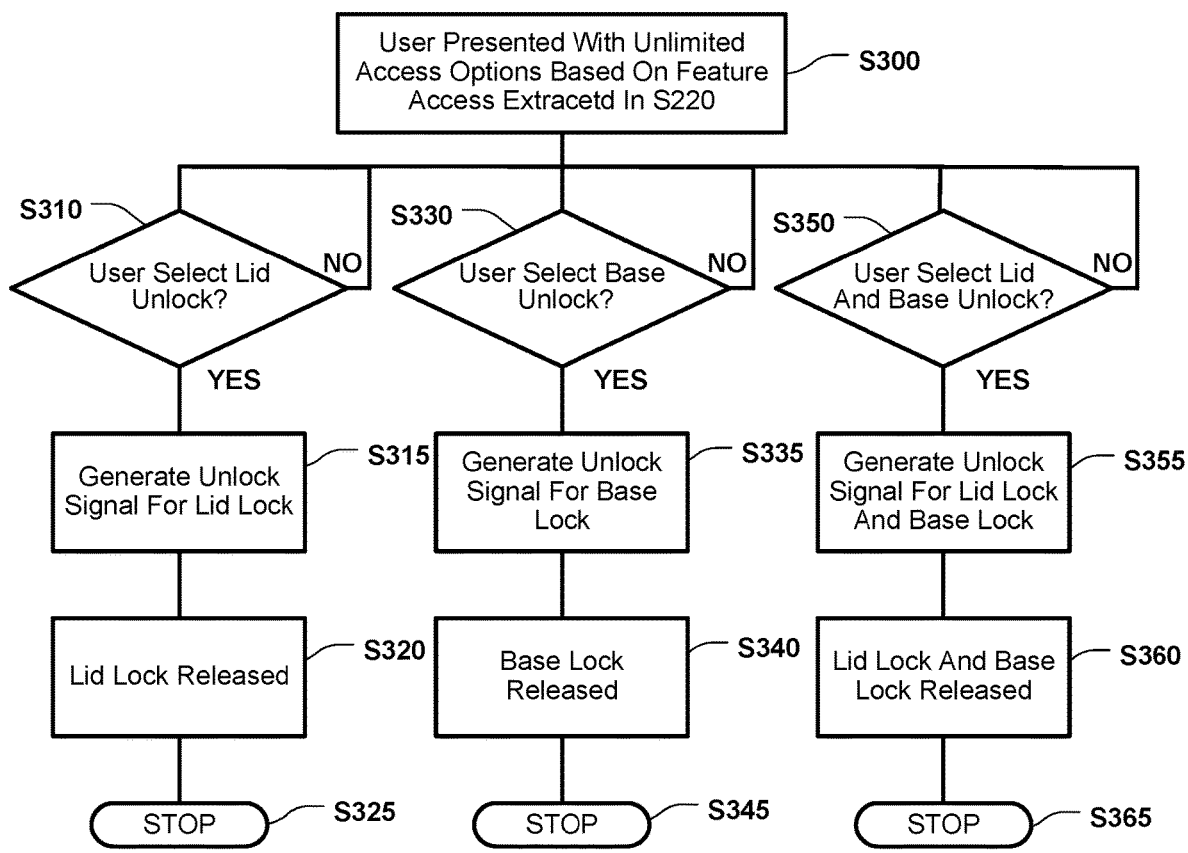
FIG. 16 illustrates a flowchart outlining exemplary steps for allowing a user to use the security case and access the security case based on established access options for the user, according to the present disclosure.
Figure 17:
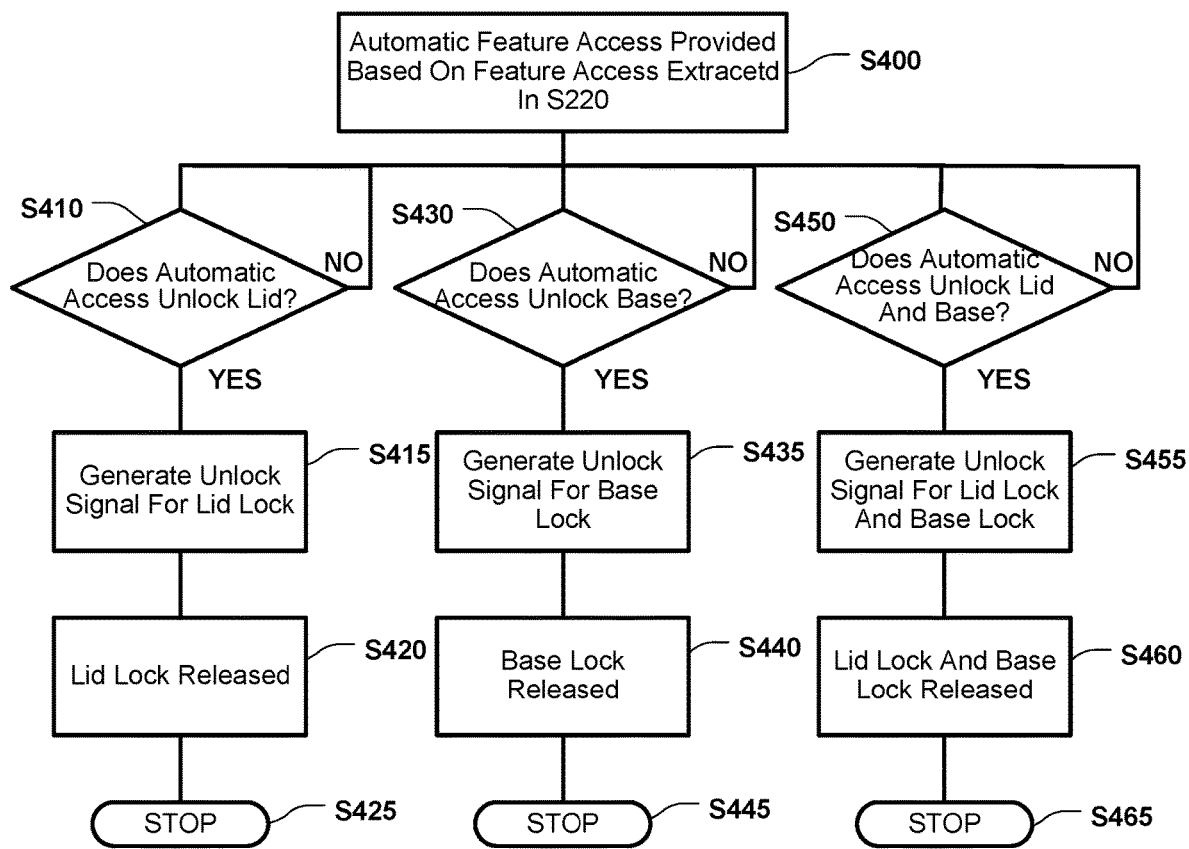
FIG. 17 illustrates a flowchart outlining exemplary steps for allowing a user to use the security case and access the security case based on established access options for the user, according to the present disclosure.
Figure 18:
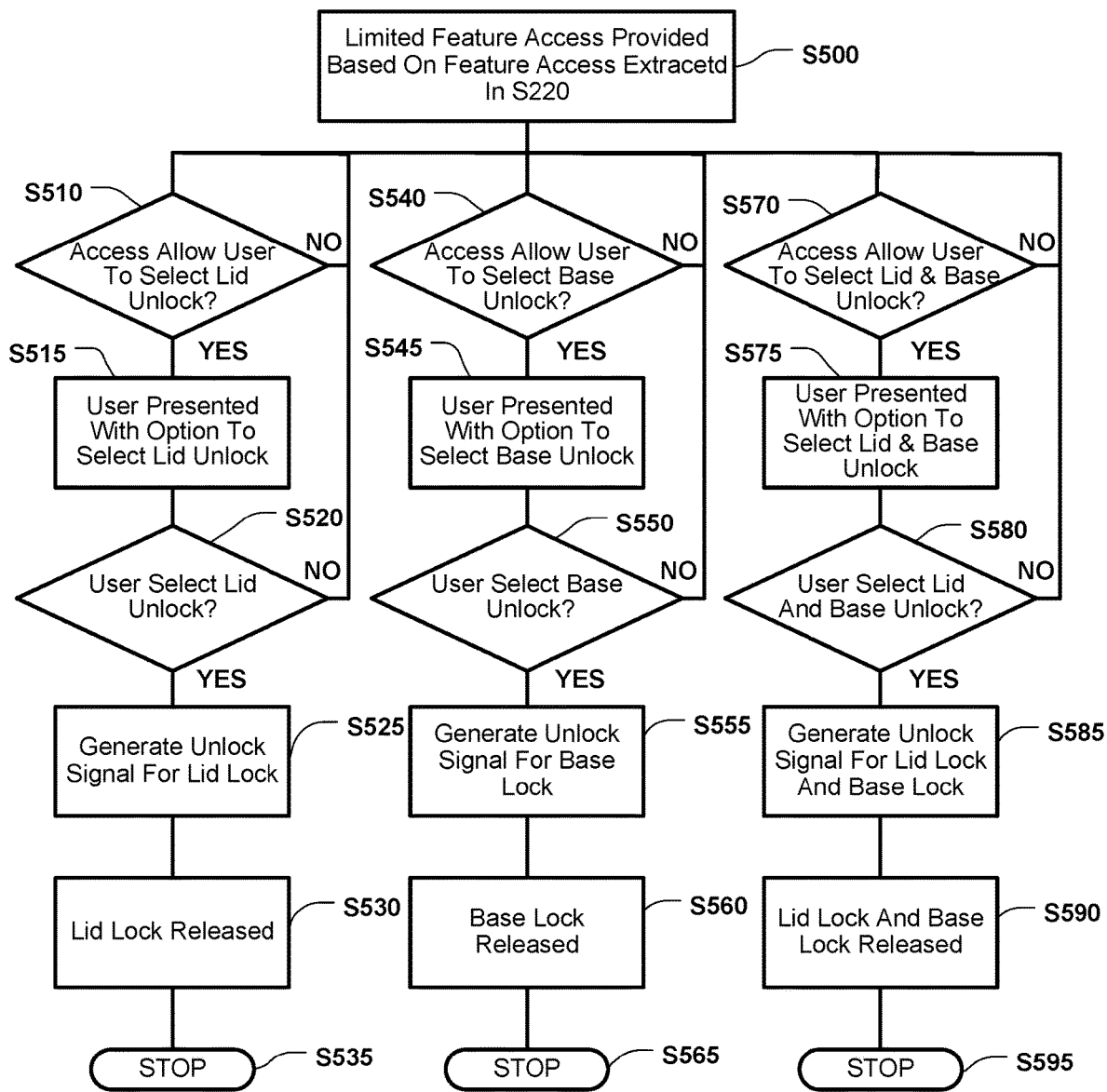
FIG. 18 illustrates a flowchart outlining exemplary steps for allowing a user to use the security case and access the security case based on established access options for the user, according to the present disclosure.
Figure 19:
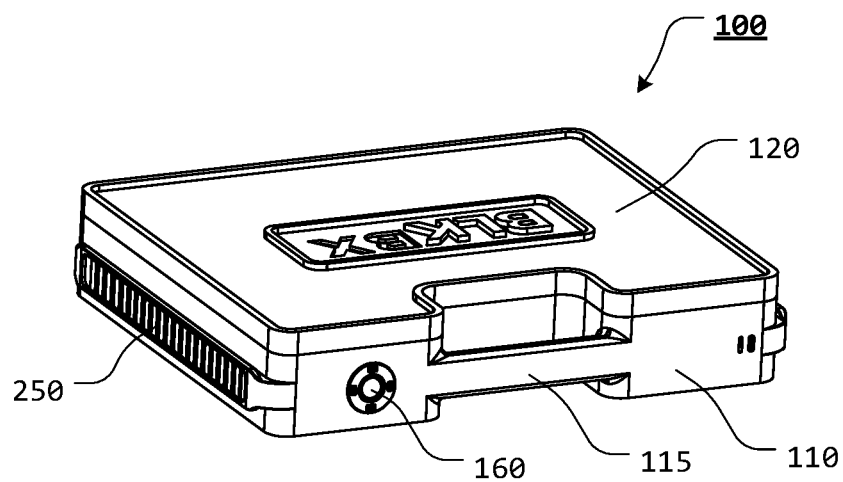
FIG. 19 illustrates an upper, front, left perspective view of an exemplary embodiment of a security case, according to the present disclosure.
Figure 20:
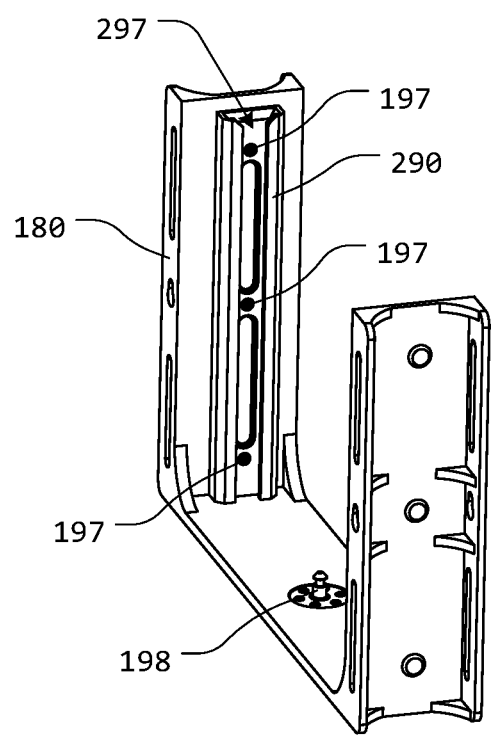
FIG. 20 illustrates a top side view of an exemplary embodiment of a mounting bracket, according to the present disclosure.
Figure 21:
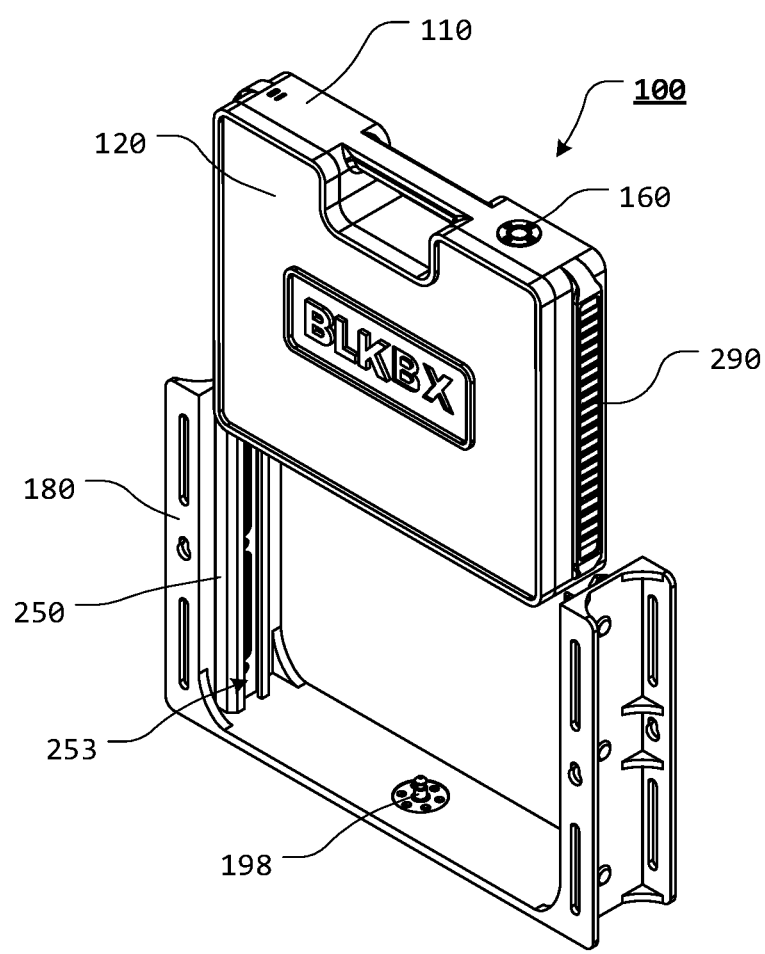
FIG. 21 illustrates a top side view of an exemplary embodiment of a security case aligned with an exemplary embodiment of a mounting bracket, according to the present disclosure.

FIG. 14 illustrates a flowchart outlining exemplary steps for registering a user to use the security case 100 and establishing access options for the user. As illustrated, the exemplary method begins at step S100 and control continues to step S110, wherein user utilizes the data input interface 160 to access the controller 165 to establish an authorization set and feature access for the security case 100. The method then advances to step S120 and the user (or "enrollee") input is identified by the controller 165. Then, in step S130, the user's input is processed by the controller 165 and the method advances to step S150 wherein the user's authorization set and feature access is established within the controller 165. Once established, the method advances to step S160 and the authorization set and feature access information is stored in a database of the controller 165.

Once the authorization set and feature access information has been stored, the method advances to step S170, wherein the method stops. Once this method stops, the user is able to utilize the data input interface 160 to access the controller 165 and execute the authorization set and feature access stored in the database.

FIGS. 15-18 illustrate a flowchart outlining exemplary steps for allowing a user to use the security case 100 and access the security case 100 or remove the security case 100 from a mounting bracket 180, based on established access options for the user. As illustrated, the exemplary method begins at step S200 and control continues to step S205, wherein a user utilizes the data input interface 160 to access the security case 100 and an input is received from the user. When the input is received, the method advances to step S210 and the input is recognized by the controller 165. Once the input is recognized, the method advances to step S215 and the input data is processed by the controller. Processing, the input data is used to determine the authorization set and feature access stored in the database for the identified user.

Once the input data is processed, the method advances to step S220 and the authorization set and feature access information is extracted from the database for the identified user. Once the data is extracted, the method advances to step S225 and a determination is made as to whether the verified user information and the extracted authorization set and feature access information match within the database. If, in step S225 it is determined that the verified user information in the extracted authorization set feature access information does not match the information within the database, the method continues to step S230 and the user is not provided with access and a timed delay is initiated before a subsequent input is received through the data input interface 160 and the method returns to step S205.

If, in step S225 it is determined that the verified user information in the extracted authorization set feature access information matches the information within the database, the method advances to step S235 and a determination is made as to whether the verified user has been granted unlimited feature access to the security case 100. In various exemplary embodiments, unlimited feature access allows the user to control the lid lock 130 to unlock the lid 120 of the security case 100, control the post lock 140 to release locking post 198, and control any included rail lock(s) 170 to retract the movable pin 170 and release the base 110 from the rail element 190.

If, in step S235 it is determined that the verified user has been granted unlimited feature access to the security case 100, control advances to step S300 and the user is presented with unlimited access options, based upon the feature access information extracted in step S220. Next, in step S310, a determination is made as to whether the user has selected the lid unlock feature. If so, control continues to step S315 and the controller 165 generates an unlock signal for the lid lock 130 and control advances to step S320 and the lid lock 130 is controlled to release the lid latch 122. Once the lid lock 130 has been so controlled, the method advances to step S325 and the method ends.

If, in step S310, it is determined that the user has not selected the lid unlock feature, control advances to step S330 wherein a determination is made as to whether the user has selected the base unlock feature. If so, control continues to step S335 and the controller 165 generates an unlock signal for the post lock 140 (and any included rail lock(s) 170) then, control advances to step S340 and the post lock 140 is controlled to release the locking post 198 (and any included rail lock(s) 170 are controlled to retract the movable pin 170)

so that the base 110 is released from the rail element 190 and the security case 100 can be slidably removed from the mounting bracket 180. Once the post lock 140 (and any included rail lock(s) 170) has/have been so controlled, the method advances to step S345 and the method ends.

If, in step S330, it is determined that the user has not selected the base unlock feature, control advances to step S350 wherein a determination is made as to whether the user has selected both the lid unlock and the base unlock features. If so, control continues to step S355 and the controller 165 generates an unlock signal for the lid lock 130 and also generates an unlock signal for the post lock 140 (and any included rail lock(s) 170) then, control advances to step S360. In step S360, the lid lock 130 is controlled to release the lid latch 122 and the post lock 140 is also controlled to release the locking post 198 (and any included rail lock(s) 170 are controlled to retract the movable pin 170). Once the lid lock 130 and the post lock 140 (and any included rail lock(s) 170) have been so controlled, the method advances to step S365 and the method ends.

If, in step S235 it is determined that the verified user has not been granted unlimited feature access to the security case 100, control advances to step S240 and a determination is made as to whether the verified user has been granted automatic feature access to the security case 100. If so, control advances to step S400 and the feature access information extracted in step S220 is provided to the controller 165. Next, in step S410, a determination is made as to whether the user has been granted automatic access to the lid unlock feature. If so, control continues to step S415 and the controller 165 generates an unlock signal for the lid lock 130 and control advances to step S420 and the lid lock 130 is controlled to release the lid latch 122. Once the lid lock 130 has been so controlled, the method advances to step S425 and the method ends.

If, in step S410, it is determined that the user has not been granted automatic access to the lid unlock feature, control advances to step S430 wherein a determination is made as to whether the user has been granted automatic access to the base unlock feature. If so, control continues to step S435 and the controller 165 generates an unlock signal for the post lock 140 (and any included rail lock(s) 170) then, control advances to step S440 and the post lock 140 is controlled to release the locking post 198 (and any included rail lock(s) 170 are controlled to retract the movable pin 170) so that the base 110 is released from the rail element 190 and the security case 100 can be slidably removed from the mounting bracket 180. Once the post lock 140 (and any included rail lock(s) 170) has/have been so controlled, the method advances to step S445 and the method ends.

If, in step S430, it is determined that the user has not been granted automatic access to the base unlock feature, control advances to step S450 wherein a determination is made as to whether the user has been granted automatic access to both the lid unlock and the base unlock features. If so, control continues to step S455 and the controller 165 generates an unlock signal for the lid lock 130 and also generates an unlock signal for the post lock 140 (and any included rail lock(s) 170) then, control advances to step S460. In step S460, the lid lock 130 is controlled to release the lid latch 122 and the post lock 140 is also controlled to release the locking post 198 (and any included rail lock(s) 170 are controlled to retract the movable pin 170). Once the lid lock 130 and the post lock 140 (and any included rail lock(s) 170) have been so controlled, the method advances to step S465 and the method ends.

If, in step S240 it is determined that the verified user has not been granted unlimited feature access to the security case 100, control advances to step S245 and a determination is made as to whether the verified user has been granted automatic feature access to the security case 100. If so, control advances to step S500 and the feature access information extracted in step S220 is provided to the controller 165. Next, in step S510, a determination is made as to whether the user has been granted access to the lid unlock feature. If so, control continues to step S515 and the user is presented with an option to select the lid unlock feature. If, in step S520 it is determined that the user has not selected the lid unlock feature, the method advances to step S540. Otherwise, if it is determined in step S520 that the user has selected the lid unlock feature, the method advances to step S525 and the controller 165 generates an unlock signal for the lid lock 130 and control advances to step S530 and the lid lock 130 is controlled to release the lid latch 122. Once the lid lock 130 has been so controlled, the method advances to step S535 and the method ends.

If, in step S510, it is determined that the user has not been granted access to the lid unlock feature, control advances to step S540 wherein a determination is made as to whether the user has been granted access to the base unlock feature. If so, control continues to step S545 and the user is presented with an option to select the base unlock feature. If, in step S550 it is determined that the user has not selected the base unlock feature, the method advances to step S570. Otherwise, if it is determined in step S550 that the user has selected the base unlock feature, the method advances to step S555 and the controller 165 generates an unlock signal for the post lock 140 (and any included rail lock(s) 170) then, control advances to step S560 and the post lock 140 is controlled to release the locking post 198 (and any included rail lock(s) 170 are controlled to retract the movable pin 170) so that the base 110 is released from the rail element 190 and the security case 100 can be slidably removed from the mounting bracket 180. Once the post lock 140 (and any included rail lock(s) 170) has/have been so controlled, the method advances to step S565 and the method ends.

If, in step S540, it is determined that the user has not been granted access to the base unlock feature, control advances to step S570 wherein a determination is made as to whether the user has been granted access to both the lid unlock and the base unlock features. If so, control continues to step S575 and the user is presented with an option to select the both the lid unlock and the base unlock features. If, in step S580 it is determined that the user has not selected both the lid unlock and the base unlock features, the method returns to step S510. Otherwise, if it is determined in step S580 that the user has selected both the lid unlock and the base unlock features, the method advances to step S585 and the controller 165 generates an unlock signal for the lid lock 130 and also generates an unlock signal for the post lock 140 (and any included rail lock(s) 170) then, control advances to step S590. In step S590, the lid lock 130 is controlled to release the lid latch 122 and the post lock 140 is also controlled to release the locking post 198 (and any included rail lock(s) 170 are controlled to retract the movable pin 170). Once the lid lock 130 and the post lock 140 (and any included rail lock(s) 170) have been so controlled, the method advances to step S595 and the method ends.

While step S510, step S540, and step S570 are initially described as being presented in a cascading fashion (step S540 only being presented if step S510 is not selected and step S570 only being presented if step S540 is not selected), the method is not so limited. For example, step S510, step S540, and step S570 may all be presented to the user simultaneously for selection.

In certain exemplary embodiments, the base 110 of the security case 100 comprises a locking post aperture 112 sized to receive a locking post 198 affixed to the bottom portion 182 of the mounting bracket 180. The cavity 113 of the base 110 is configured with a post lock 140 that engages and disengages the locking post 198. A data input interface 160 located on the exterior of the security case 100 can selectively send data to a controller 165 to lock or unlock the lid 120 from the base 110 as well as engage or disengage the security case 100 from the post lock 140. The data input interface 160, via the controller 165, can actuate the lid lock 130 as well as the post lock 140, while in the closed position. The security case 100 has the ability to selectively actuate lid lock 130, the post lock 140, and/or the rail lock(s) 170 between a lock and unlocked position in response to a signal form the controller 165 and from and engage and disengage position.

The mounting bracket 180 is optionally comprised of a bottom portion 182 that is connected at its ends by two extension arms 183 and 184 that extend to form a substantially "U"-shape with an open top end portion opposite the bottom portion 182 being adapted to receive a security case 100; the bottom portion 182 and extension arms 183 and 184 of the mounting bracket 180 are adapted to attach to an item or surface. The mounting bracket 180 optionally has a locking post 198 affixed to the bottom portion 182 that penetrates the base 110 of the security case 100 and securely engages the post lock 140. The mounting bracket 180 is adapted to accept the receiver 150 by traditional methods of attachment.

The security case 100 is positioned within the mounting bracket 180 in such a fashion that the handle of the security case 100 is opposite the bottom portion 182 so that the bottom of the security case 100 can accept the latching mechanism. The receiving rail 190 is designed to mate with the mounting bracket 180. The receiving rail 190 itself is composed of a male component and female counterpart that intersect when slid together and the adaptation is interchangeable, meaning depending on the application the male or female iteration can be affixed to the mounting bracket 180 and the antitheses would be affixed to the security case 100.

In various exemplary embodiments, the security case 100 can be mounted to an item or surface. First, the mounting bracket 180 is attached or coupled to the item or surface with the extension arms 183 and 184 extending from the surface. Then, the security case 100 is inserted into the mounting bracket 180 via interaction of the receiving rail, 190, which are attached two extension arms 183 and 184 of the mounting bracket 180 and the receiver grooves 153 of the receivers 150. The security case 100 is urged into the mounting bracket 180 so that the locking post 198 affixed to the base 110 of the mounting bracket 180 passes through the base 110 thereby engaging the post lock 140 located in the base 110 and thereby reasonably securing the security case 100 to the mounting bracket 180 and surface.

The data input interface 160 can be utilized to actuate the mechanism to release the latching element in the cavity 113 of the security case 100 whereby detaching the security case 100 from the post lock 140 and allowing the security case 100 to slide along the rail 190 thus releasing the security case 100 from the surface and the mounting bracket 180 for travel or for relocation into another mounting bracket 180.

The rail lock 170 located in the cavity 113 of the security case 100 is actuated by the data input interface 160 located on the exterior of the security case 100.

Thus, the security case 100 may interact with multiple mounting brackets 180 for a secure mounting system that enables a security case 100 to be secured to multiple fixed locations.

While the present disclosure has been described in conjunction with the exemplary embodiments outlined above, the foregoing description of exemplary embodiments of the present disclosure, as set forth above, are intended to be illustrative, not limiting and the fundamental disclosed systems, methods, and/or apparatuses should not be considered to be necessarily so constrained. It is evident that the present disclosure is not limited to the particular variation set forth and many alternatives, adaptations modifications, and/or variations will be apparent to those skilled in the art.

It is to be understood that the phraseology of terminology employed herein is for the purpose of description and not of limitation. Unless defined otherwise, all technical and scientific terms used herein have the same meaning as commonly understood by one of ordinary skill in the art to which the present disclosure belongs.

In addition, it is contemplated that any optional feature of the inventive variations described herein may be set forth and claimed independently, or in combination with any one or more of the features described herein.

Furthermore, where a range of values or dimensions is provided, it is understood that every intervening value or dimension, between the upper and lower limit of that range and any other stated or intervening value or dimension in that stated range is encompassed within the present disclosure. The upper and lower limits of these smaller ranges may independently be included in the smaller ranges and is also encompassed within the present disclosure, subject to any specifically excluded limit in the stated range. Where the stated range includes one or both of the limits, ranges excluding either or both of those included limits are also included in the present disclosure.

Accordingly, the foregoing description of exemplary embodiments will reveal the general nature of the present disclosure, such that others may, by applying current knowledge, change, vary, modify, and/or adapt these exemplary, non-limiting embodiments for various applications without departing from the spirit and scope of the present disclosure and elements or methods similar or equivalent to those described herein can be used in practicing the present disclosure. Any and all such changes, variations, modifications, and/or adaptations should and are intended to be comprehended within the meaning and range of equivalents of the disclosed exemplary embodiments and may be substituted without departing from the true spirit and scope of the present disclosure.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:
1. A secure mounting system for a security case, comprising:

a security case having a base, wherein a cavity having an open top portion is defined within at least a portion of said base, a lid pivotably attached or coupled to at least a portion of said base via at least one hinge, wherein said lid is pivotable between an open position and a closed position, wherein in said closed position said lid covers said cavity, wherein a lid latch extends from at least a portion of said lid, wherein a receiver extends from each of two opposing exterior sides of said base, and wherein an elongate receiver groove extends along each of said receivers;

a lid lock attached or coupled to said base, wherein said lid lock includes a locking latch that is movable between an engaged position and a disengaged position, wherein in said engaged position said locking latch engages said lid latch when said lid is in said closed position to assist in maintaining said lid in said closed position, and wherein a latch solenoid at least moves said lid latch to said disengaged position;

a mounting bracket having a bottom portion and two extending arms, wherein each of said extending arms extends from an opposing end portion of the bottom portion, a rail element extending from an interior surface of each extending arm, wherein each rail element is formed so as to engage a respective elongate receiver groove and be slidably received within said respective elongate receiver grooves;

a locking post extending from said bottom portion of said mounting bracket and a locking post aperture formed through a portion of said base, wherein at least a portion of said locking post is receivable within at least a portion of said locking post aperture when said security case is positioned within said mounting bracket, such that each of said respective rail elements is slidably received within said respective elongate receiver groove;

a post lock included in said base, wherein said post lock includes a post latch that is movable between an engaged position and a disengaged position, wherein in said engaged position said post latch engages at least a portion of said locking post when said locking post is positioned within said locking post aperture to assist in maintaining said security case within said mounting bracket, and wherein a lock solenoid at least moves said post latch to said disengaged position; and a controller electrically connected to a data input interface, wherein said controller is electrically connected to said lid lock and said post lock such that one or more inputs from said data input interface are received by said controller to control said latch solenoid to at least move said lid latch to said disengaged position and/or to control said lock solenoid to at least move said post latch to said disengaged position.

2. The secure mounting system for a security case of claim 1, wherein a handle is formed in a portion of said base.

3. The secure mounting system for a security case of claim 1, wherein said at least one hinge includes at least one spring biasing element such that said lid is spring biased to said open position.

4. The secure mounting system for a security case of claim 1, wherein said lid is spring biased to said open position.

5. The secure mounting system for a security case of claim 1, wherein said receivers are removably attached or coupled to said base.

6. The secure mounting system for a security case of claim 1, wherein said receivers are formed as an integral portion of said base.

7. The secure mounting system for a security case of claim 1, wherein said elongate receiver groove extends along a longitudinal axis of said receiver.

8. The secure mounting system for a security case of claim 1, wherein said receiver groove is formed of a substantially picatinny or dovetail shaped receiver groove.

9. The secure mounting system for a security case of claim 1, wherein and said disengaged position, said lid lock does not engage said lid latch.

10. The secure mounting system for a security case of claim 1, wherein said latch solenoid controls said lid latch to move between said engaged position and said disengaged position.

11. The secure mounting system for a security case of claim 1, wherein said mounting bracket comprises a substantially "U" shaped bracket.

12. The secure mounting system for a security case of claim 1, wherein each of said rail elements is removably attached or coupled of one of said extending arms.

13. The secure mounting system for a security case of claim 1, wherein each of said rail elements is formed as an integral portion of one of said extending arms.

14. The secure mounting system for a security case of claim 1, wherein each of said rail elements is formed of a substantially picatinny or dovetail shaped receiver element.

15. The secure mounting system for a security case of claim 1, further comprising a rail lock positioned on one or both of the sides of the body, wherein said rail lock includes a movable pin that is movable between an extended position and a retracted position, wherein in said extended position at least a portion of said movable pin passes through a pin aperture in a side of said body and extends so as to engage a portion of said rail element, and wherein said rail lock is electrically connected to said controller such that said controller controls said rail lock to move said movable pin between said extended position and said retracted position.

16. The secure mounting system for a security case of claim 1, wherein said controller simultaneously controls both said latch solenoid to at least move said lid latch to said disengaged position and said lock solenoid to at least move said post latch to said disengaged position.

17. A secure mounting system for a security case, comprising:

a security case having a base, wherein a cavity having an open top portion is defined within at least a portion of said base, a lid hingedly attached or coupled to at least a portion of said base such that said lid is pivotable between an open position and a closed position, wherein in said closed position said lid covers said cavity, wherein a lid latch extends from at least a portion of said lid, wherein a receiver extends from each of two opposing exterior sides of said base, and wherein an elongate receiver groove extends along each of said receivers;

a lid lock attached or coupled to said base, wherein said lid lock includes a locking latch that is movable between an engaged position and a disengaged position, wherein in said engaged position said locking latch engages said lid latch when said lid is in said closed position to assist in maintaining said lid in said closed position, and wherein a latch solenoid at least moves said lid latch between said engaged position and said disengaged position;

a mounting bracket having a bottom portion and two extending arms, wherein each of said extending arms extends from an opposing end portion of the bottom portion, a rail element extending from an interior surface of each extending arm, wherein each rail element is formed so as to be slidably received within one of said elongate receiver grooves;

a locking post extending from said bottom portion of said mounting bracket and a locking post aperture formed through a portion of said base, wherein at least a portion of said locking post is receivable through said locking post aperture when said security case is positioned within said mounting bracket, such that each of said respective rail elements is slidably received within said respective elongate receiver groove;

a post lock included in said base, wherein said post lock includes a post latch that is movable between an engaged position and a disengaged position, wherein in said engaged position said post latch engages at least a portion of said locking post when said locking post extends through said locking post aperture to assist in maintaining said security case within said mounting bracket, and wherein a lock solenoid moves said post latch between said engaged position and said disengaged position;

a controller electrically connected to a data input interface, wherein said controller is electrically connected to said lid lock and said post lock such that one or more inputs from said data input interface are received by said controller to simultaneously or independently control said latch solenoid to move said lid latch to said disengaged position and/or to control said lock solenoid to at least move said post latch to said disengaged position.

18. The secure mounting system for a security case of claim 17, wherein said lid is spring biased to said open position.

19. A secure mounting system for a security case, comprising:

a security case having a base, wherein a cavity is defined within at least a portion of said base, a lid pivotably attached or coupled to at least a portion of said base via at least one hinge, wherein said lid is pivotable between an open position and a closed position, wherein said lid is spring biased to said open position, wherein in said closed position said lid covers said cavity, wherein a lid latch extends from at least a portion of said lid, wherein a receiver extends from each of two opposing exterior sides of said base, and wherein an elongate receiver groove extends along each of said receivers;

a lid lock attached or coupled to said base, wherein said lid lock includes a locking latch that is movable between an engaged position and a disengaged position, wherein in said engaged position said locking latch engages said lid latch when said lid is in said closed position to assist in maintaining said lid in said closed position, and wherein a latch solenoid at least moves said lid latch between said engaged position and said disengaged position;

a mounting bracket having a bottom portion and two extending arms, wherein each of said extending arms extends from an opposing end portion of the bottom portion, a rail element extending from an interior surface of each extending arm, wherein each rail element is mateable with said elongate receiver grooves so as to be slidably received within one of said elongate receiver grooves;

a locking post extending from said bottom portion of said mounting bracket and a locking post aperture formed through a portion of said base, wherein at least a portion of said locking post is receivable through said locking post aperture when said security case is positioned within said mounting bracket, such that each of said respective rail elements is slidably received within said respective elongate receiver groove;

a post lock included in said base, wherein said post lock includes a post latch that is movable between an engaged position and a disengaged position, wherein in said engaged position said post latch engages at least a portion of said locking post when said locking post extends through said locking post aperture to assist in maintaining said security case within said mounting bracket, and wherein a lock solenoid moves said post latch between said engaged position and said disengaged position;

a rail lock positioned on one or both of the sides of the body, wherein said rail lock includes a movable pin that is movable between an extended position and a retracted position, wherein in said extended position at least a portion of said movable pin passes through a pin aperture in a side of said body and extends so as to engage a portion of said rail element; and a controller electrically connected to a data input interface, wherein said controller is electrically connected to said lid lock, said post lock, and said rail lock such that one or more inputs from said data input interface are received by said controller to simultaneously or independently control said latch solenoid to move said lid latch to said disengaged position, to control said lock solenoid to at least move said post latch to said disengaged position, and/or to control said rail lock to at least move said movable pin between said extended position and said retracted position.

20. The secure mounting system for a security case of claim 19, wherein said receiver groove is formed of a substantially picatinny or dovetail shaped receiver groove.

* * * * *